United States Patent [19]

Ito et al.

[11] Patent Number: 4,458,012
[45] Date of Patent: Jul. 3, 1984

[54] LIGHT-SENSITIVE SILVER HALIDE COLOR PHOTOGRAPHIC MATERIAL

[75] Inventors: Kenji Ito; Satoru Shimba; Yasuo Tsuda; Hiroshi Sugita, all of Hino, Japan

[73] Assignee: Konishiroku Photo Industry Co., Ltd., Tokyo, Japan

[21] Appl. No.: 468,408

[22] Filed: Feb. 22, 1983

[30] Foreign Application Priority Data

Feb. 25, 1982 [JP] Japan .................................. 57-30390

[51] Int. Cl.$^3$ .............................................. G03C 7/26
[52] U.S. Cl. ..................................... 430/549; 430/552; 430/553; 430/558; 430/562
[58] Field of Search ............... 430/549, 552, 553, 558, 430/562

[56] References Cited

U.S. PATENT DOCUMENTS

| | | | |
|---|---|---|---|
| 3,446,622 | 5/1969 | Magagnoli et al. | 430/552 |
| 3,758,308 | 9/1973 | Beavers et al. | 430/553 |
| 3,880,661 | 4/1975 | Lau et al. | 430/553 |
| 4,004,929 | 1/1977 | Orvis | 430/549 |
| 4,297,438 | 10/1981 | Haseler et al. | 430/549 |
| 4,333,999 | 6/1982 | Lau | 430/553 |

*Primary Examiner*—J. Travis Brown
*Attorney, Agent, or Firm*—Frishauf, Holtz, Goodman & Woodward

[57] ABSTRACT

Disclosed is a light-sensitive silver halide color photographic material having at least one light-sensitive silver halide emulsion layer on a support, characterized in that said light-sensitive silver halide emulsion layer contains a cyan coupler represented by formula [I] shown below, and said light-sensitive silver halide emulsion layer and/or a layer contiguous to said light-sensitive silver halide emulsion layer contains a colored cyan coupler represented by the formula [II]:

Formula [I]:

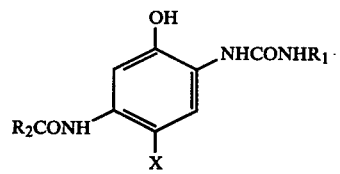

wherein X, $R_1$ and $R_2$ are as defined in the specification;

Formula [II]:

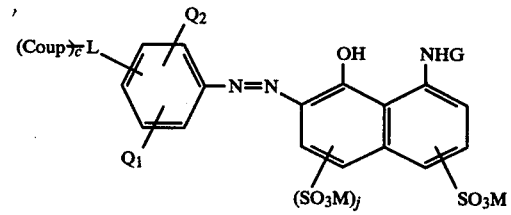

wherein (Coup—)$_c$, L, $Q_1$, $Q_2$, M, j, and G are as defined in the specification.

17 Claims, 7 Drawing Figures

LIGHT-SENSITIVE SILVER HALIDE COLOR PHOTOGRAPHIC MATERIAL

This invention relates to a light-sensitive silver halide color photographic material which is highly sensitive and excellent in various characteristics such as graininess, gradation characteristic, color reproduction, processing adaptability and others. More particularly, it pertains to a light-sensitive silver halide color photographic material in which the image to be formed in the cyan image forming layer is very high in sensitivity and at the same time excellent in its color reproduction and processing adaptability.

It is generally strongly demanded in society to provide a light-sensitive silver halide color photographic material having higher sensitivity as well as excellent image quality. This is also a continuing technical task to be solved in the art of photography. However, it is very difficult to increase dramatically the sensitivity of a light-sensitive silver halide color photographic material. In particular, partly because the cyan image forming layer in a multi-layer light-sensitive silver halide color photogrpahic material is generally positioned on the support side, high sensitization of said light-sensitive layer and improvements in graininess, gradation, color reproduction and other image qualities to be obtained in said layer are particularly difficult and no satisfactory technique has been developed in this respect. This may be due to the loss at the time of development caused by the occurrence of delayed diffusion of an aromatic primary amine developing agent during development in sensitive layers contiguous to the support of a multi-layer light-sensitive color photographic material or optical loss by the non-sensitive layer positioned in the upper portion of the photographic material during exposure. Moreover, as the problem inherent in the cyan image forming layer, the colored image formed by the color development processing is subject to poor color return (i.e. a phenomenon that a cyan dye altered to a substantially colorless compound cannot completely be returned to the original dye). These problems make it very difficult to obtain a sufficiently satisfactory cyan image forming layer.

Further, as the problem inherent in the cyan image forming layer, a naphthol type or a phenol type cyan coupler, when forming a cyan color image through the coupling reaction with an oxidized product such as of an aromatic primary amine developing agent, does not form an ideal spectroscopic absorption spectrum, but generally has a broad side-absorption as the green light at its center. Such a side-absorption is not desirable in color reproduction of a light-sensitive material. As a means for removing such a distortion in color reproduction, there is generally practiced in the art the so called masking method, in which a colored color image forming coupler (namely colored coupler) is used, as described in detail in J. Phot. Soc. Am. 13,94 (1947), J. Opt. Soc. Am. 40,166 (1950) or J. Am. Chem. Soc. 72, 1533 (1950). However, in the masking method of the prior art, no masking over the entire spectroscopic absorption spectra has yet been obtained. For example, most of the colored couplers of the prior art, as disclosed in U.S. Pat. No. 2,521,908 are too shallow in colors at the peak absorptions thereof, and accordingly it is impossible to obtain a uniform masking effect over all the ranges of the spectroscopic absorption spectrum. Also, some colored couplers, in combination with couplers for formation of colorless cyan images, are too different in respective reaction rates or relative reactivities from each other to obtain an uniform masking from a low light exposure region to a high light exposure region. Further, among the colored couplers of the type which can release diffusible dyes, there exist some which are excellent in color phase, but, when combined with a cyan coupler, many of them have the drawback in stagnation stability of minute oil droplets of a mixed dispersion, as the result of the action caused by their hydrophilic groups.

Accordingly, an object of this invention is to provide a light-sensitive silver halide color photographic material which is high in sensitivity of the cyan image forming layer.

Another object of this invention is to provide a light-sensitive silver halide color photographic material having a cyan image forming layer which is entirely free from such problems as poor color return, etc.

Still another object of this invention is to provide a light-sensitive silver halide color photographic material having excellent color reproduction and gradation characteristics. Other objects of this invention will become apparent from the description detailed below.

Various objects of this invention have been found to be accomplished by a multi-layer light-sensitive color photographic materials shown below. That is, (1) a light-sensitive silver halide color photographic material having at least one light-sensitive silver halide emulsion layer on a support, characterized in that said light-sensitive silver halide emulsion layer contains a cyan coupler represented by the formula [I] shown below, and said light-sensitive silver halide emulsion layer and/or a layer contiguous to said light-sensitive silver halide emulsion layer contains a colored cyan coupler represented by the formula [II]; more preferably, (2) a light-sensitive silver halide color photographic material according to the above item (1), wherein the light-sensitive silver halide emulsion layer and/or a layer contiguous to said light-sensitive silver halide emulsion layer contains further at least one colored magenta coupler represented by the formula [III] shown below, was found to provide a light-sensitive silver halide color photographic material which is high in sensitivity of the cyan image forming layer, free from such problems as poor color return in processing steps and also excellent in color reproduction and gradation characteristics.

Formula [I]:

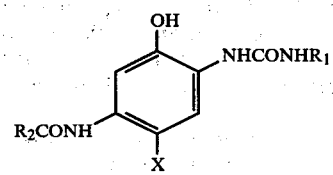

wherein X represents a hydrogen atom or a group capable of being eliminated by a coupling reaction with an oxidized product of an aromatic primary amine color developing agent; $R_1$ represents a naphthyl group or a heterocyclic group (provided that a carbon atom of a heterocyclic group is bonded to the nitrogen atoms of the ureido group), or a phenyl group having at least one substituent (with proviso that, when having cyano at the p-position relative to the ureido group, the four positions of o-position and m-position relative to the ureido group cannot have hydrogen atoms at the same time) selected from the group consisting of trifluoromethyl, nitro, cyano, —COR, —COOR, —SO$_2$R,

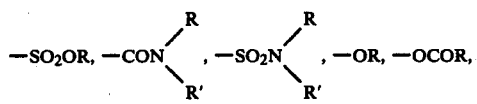

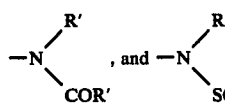

(where R represents an aliphatic group or an aromatic group, and R′ a hydrogen atom, an aliphatic group or an aromatic group); and R$_2$ represents an aliphatic group or an aromatic group necessary to impart diffusion resistance to the cyan dyes formed from the cyan couplers represented by the formula [I] and the cyan dyes to be formed from said cyan coupler.

Formula [II]:

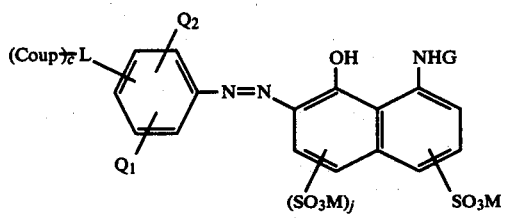

wherein (Coup—)$_c$ represents a cyan coupler residue; L represents a divalent linking group connecting the coupler structure moiety to the dye structure moiety; Q$_1$ and Q$_2$ each represent photographically inactive monovalent groups; M represents a cation or a hydrogen atom; j is an integer of 0 or 1; and G represents an acyl group or an alkylsulfonyl group having 1 to 8 carbon atoms or an arylsulfonyl group having 6 to 8 carbon atoms.

(Coup—)$_M$—N=N—W    Formula [III]

wherein (Coup—)$_M$ represents a magenta coupler residue (with proviso that the azo group is bonded to the active site of the magenta coupler); and W represents a residue of an unsaturated cyclic compound.

In the accompanying drawings, Sample Nos. 1, 2, 7, 8, 12, 14 and 15 refer to samples prepared in accordance with the Examples described in the specification.

Figure 1:
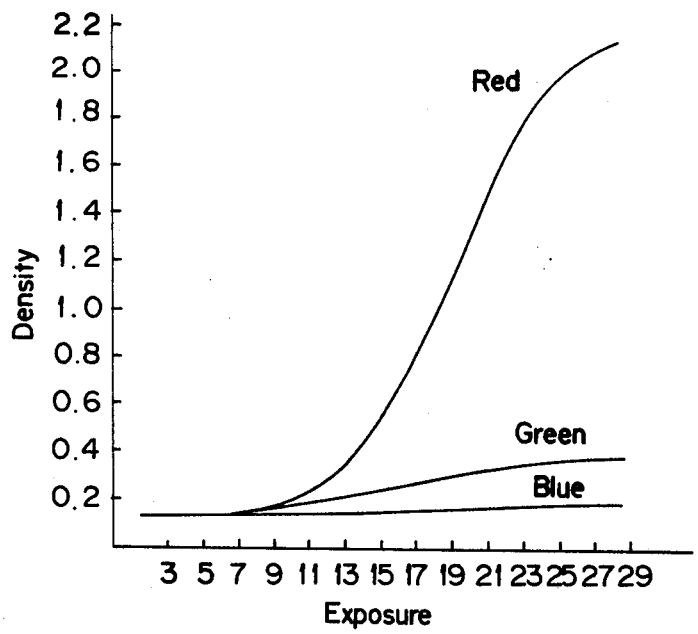
FIG. 1 is a graph indicating the characteristic curves for red, green and blue light absorptions of Sample No. 1.

Preferred cyan couplers according to the formula [I] of this invention are represented typically by the following formula [Ia] or [Ib]:

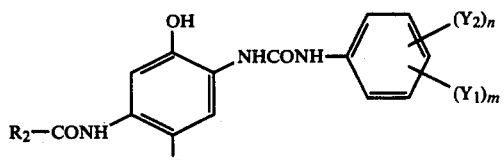

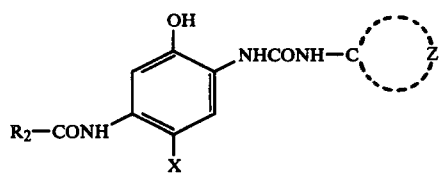

In the above formula [Ia],

Y$_1$ represents trifluoromethyl, nitro, a cyano or group represented by —COR, —COOR, —SO$_2$R, —SO$_2$OR, $$-CON\begin{matrix}R\\R'\end{matrix}, -SO_2N\begin{matrix}R\\R'\end{matrix}, -OR, -OCOR, -\overset{R'}{\underset{|}{N}}COR \text{ or}$$

$$-\overset{R'}{\underset{|}{N}}SO_2R$$

R represents an aliphatic group [preferably an alkyl group having 1 to 10 carbon atoms (e.g. methyl, butyl, cyclohexyl, benzyl)] or an aromatic group [most preferably a phenyl group (e.g. phenyl or tolyl)], and R′ represents a hydrogen atom or a group represented by R.

Y$_2$ represents a monovalent group, preferably an aliphatic group [most preferably an alkyl group having 1 to 10 carbon atoms (e.g. methyl, t-butyl, ethoxyethyl, cyanomethyl)], an aromatic group [preferably a phenyl group, a naphthyl group (e.g. phenyl, tolyl)], a halogen atom (fluorine, chlorine, bromine or the like), an amino group (e.g. ethylamino, diethylamino), a hydroxy group or a substituent represented by Y$_1$.

m is an integer of 1 to 3, and n is an integer of 0 to 3, with proviso that m+n should be 5 or less, and, when a cyano group is bonded at the p-position of the ureido group, m+n should be within the range from 2 to 5.

Z represents a group of non-metallic atoms necessary for forming a heterocyclic group or a naphthyl group, the a heterocyclic group being a five-membered or six-membered heterocyclic group containing 1 to 4 hetero atoms selected from nitrogen atoms, oxygen atoms or sulfur atoms. For example, there may be included a furyl group, a thienyl group, a pyridyl group, a quinonyl group, an oxazolyl group, a tetrazolyl group, a benzothiazolyl group, a tetrahydrofuranyl group and the like.

The heterocyclic rings may have any desired substituents incorporated therein, including, for example, alkyl groups having 1 to 10 carbon atoms (e.g. ethyl, i-propyl, i-butyl, t-butyl, t-octyl, and the like), aryl groups (e.g. phenyl, naphthyl), halogen atoms (e.g. fluorine, chlorine, bromine and the like), cyano, nitro, sulfonamide groups (e.g. methanesulfonamide, butanesulfonamide, p-toluenesulfonamide and the like), sulfamoyl groups (e.g. methylsulfamoyl, phenylsulfamoyl and the like), sulfonyl groups (e.g. methanesulfonyl, p-toluenesulfonyl and the like), fluorosulfonyl groups, carbamoyl groups (e.g. dimethylcarbamoyl, phenylcarbamoyl and the like), oxycarbonyl groups (e.g. ethoxycarbonyl, phenoxycarbonyl and the like), acyl groups (e.g. acetyl, benzoyl and the like), heterocyclic groups (e.g. pyridyl group, pyrazolyl group and the like), alkoxy groups, aryloxy groups, acyloxy groups, and so on.

$R_2$ represents an aliphatic group or an aromatic group necessary for imparting diffusion resistance to a cyan coupler represented by the above formula [I] or a cyan dye to be formed from said cyan coupler, preferably an alkyl group having 4 to 30 carbon atoms, an aryl grup or a heterocyclic group. For example, there may be included a straight or branched alkyl group (e.g. t-butyl, n-octyl, t-octyl, n-dodecyl and the like), an alkenyl group, a cycloalkyl group, a five-membered or six-membered heterocyclic group or a group represented by the formula [Ic]:

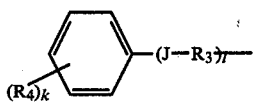

Formula [Ic]

In the above formula, J represents an oxygen atom or a sulfur atom, K represents an integer of 0 to 4; l represents an integer of 0 or 1; when K is 2 or more, the two or more existing $R_4$'s may be the same or different; $R_3$ represents a straight or branched alkyl having 1 to 20 carbon atoms; and $R_4$ represents a monovalent atom or group, including, for example, a hydrogen atom, a halogen atom (preferably chloro, bromo), an alkyl group {preferably a straight or branched alkyl group having 1 to 20 carbon atoms (e.g. methyl, tert-butyl, tert-pentyl, tert-octyl, dodecyl, pentadecyl, benzyl, phenetyl)}, an aryl group (e.g. phenyl), a heterocyclic group (preferably a nitrogen containing heterocyclic group), an alkoxy group {preferably a straight or branched alkyloxy group (e.g. methoxy, ethoxy, tert-butyloxy, octyloxy, decyloxy, dodecyloxy)}, an aryloxy group (e.g. phenoxy), a hydroxy group, an acyloxy group {preferably an alkylcarbonyloxy group, an arylcarbonyloxy group (e.g. acetoxy, benzoyloxy)}, a carboxy group, an alkoxycarbonyl group (preferably a straight or branched alkyloxycarbonyl group having 1 to 20 carbon atoms), an aryloxycarbonyl group (preferably phenoxycarbonyl), an alkylthio group (preferably having 1 to 20 carbon atoms), an acyl group (preferably a straight or branched alkylcarbonyl group having 1 to 20 carbon atoms), an acylamino group (preferably a straight or branched alkylcarboamide, benzenecarboamide having 1 to 20 carbon atoms), a sulfonamide group (preferably a straight or branched alkylsulfonamide group having 1 to 20 carbon atoms, benzenesulfonamide group), a carbamoyl group (preferably a straight or branched alkylaminocarbonyl group having 1 to 20 carbon atoms, phenylaminocarbonyl group), a sulfamoyl group (preferably an alkylaminosulfonyl group having 1 to 20 carbon atoms, phenylaminosulfonyl group) and so on. X represents a hydrogen atom or a group capable of being eliminated by a coupling reaction with an oxidized product of a color developing agent. For example, there may be included halogen atoms (e.g. chlorine, bromine, fluorine or the like), aryloxy groups, carbamoyloxy groups, carbamoylmethoxy groups, acyloxy groups, sulfonamide groups, succinimide groups and the like, of which oxygen atom or nitrogen atoms is bonded directly to the coupling position. More specifically, there may be mentioned those as disclosed in U.S. Pat. No. 3,741,563, Japanese Provisional Patent Publication No. 37425/1972, Japanese Patent Publication No. 36894/1973, Japanese provisional Patent Publication Nos. 10135/1975, 117422/1975, 130441/1975, 108841/1975, 120334/1975, 18315/1977 and 105226/1978.

The cyan coupler according to this invention can readily be synthesized by use of the methods as described in, for example, U.S. Pat. No. 3,758,308 and Japanese Provisional Patent Publication No. 65134/1981.

Preferred compounds of the cyan coupler of the formula [I] are exemplified below, but the present invention is not limited thereby.

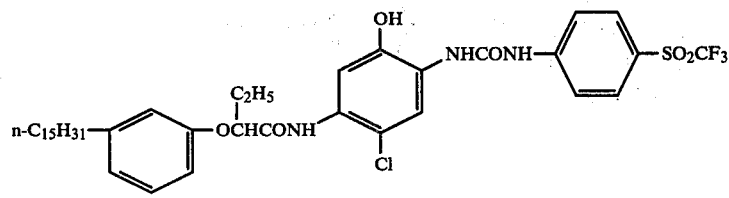

C-1

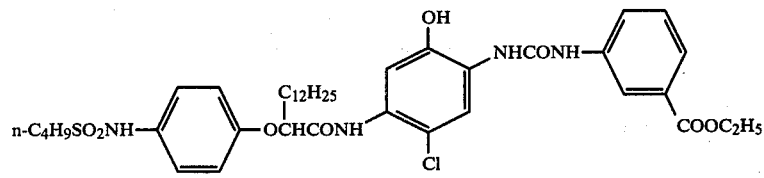

C-2

-continued
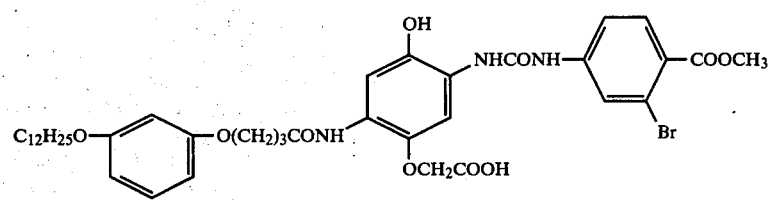
C-3
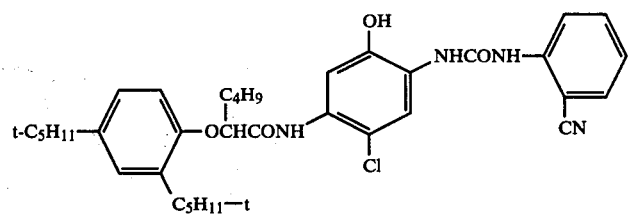
C-4
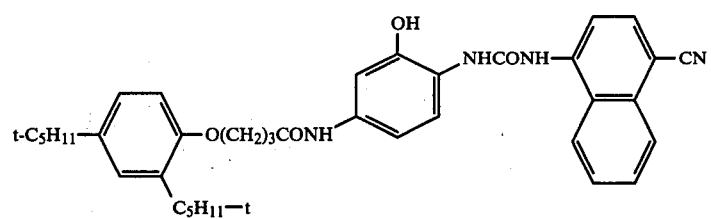
C-5
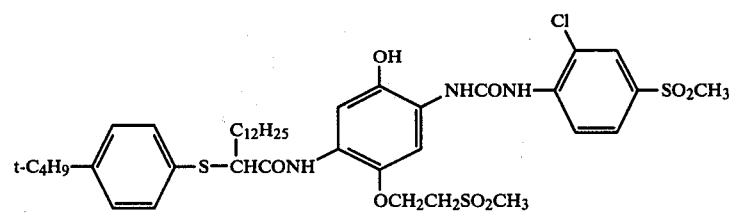
C-6
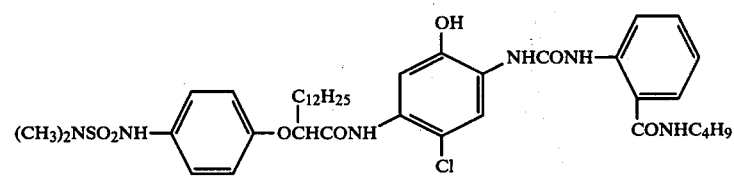
C-7
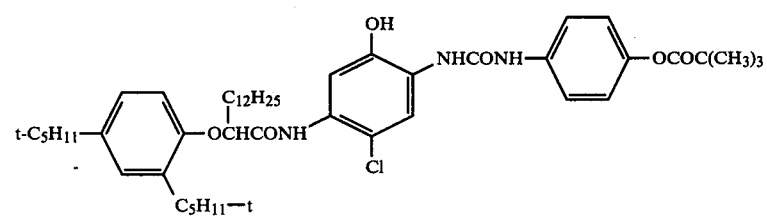
C-8
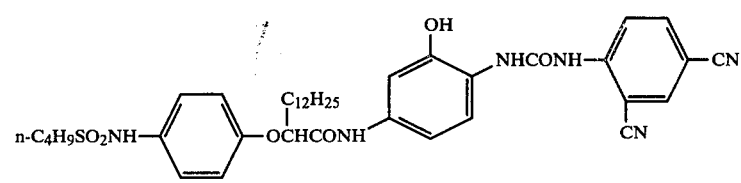
C-9

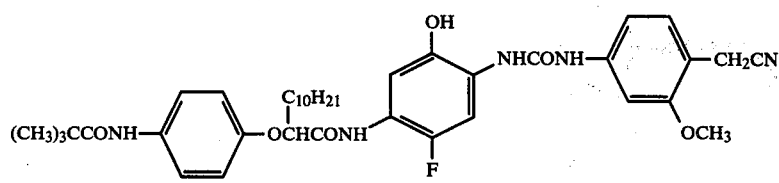
C-10
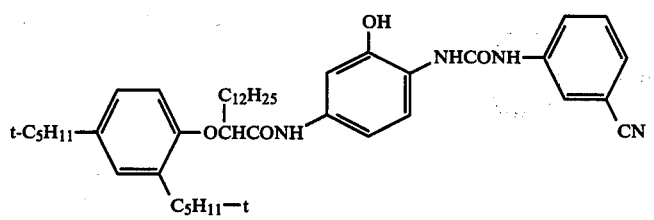
C-11
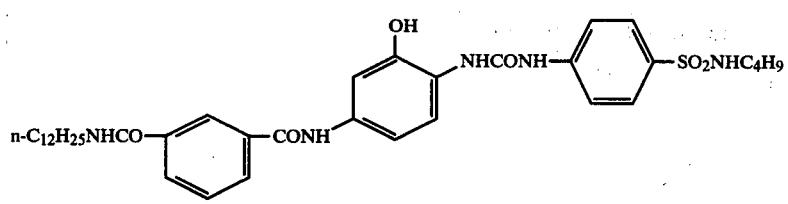
C-12
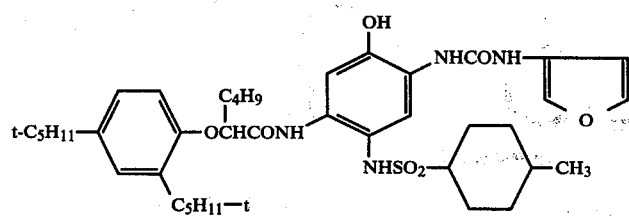
C-13
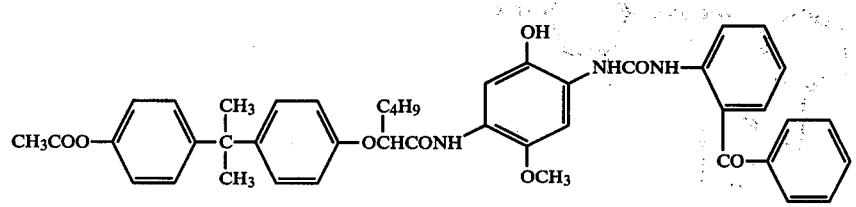
C-14
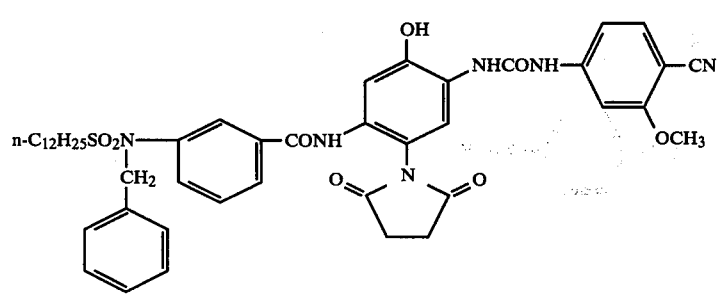
C-15
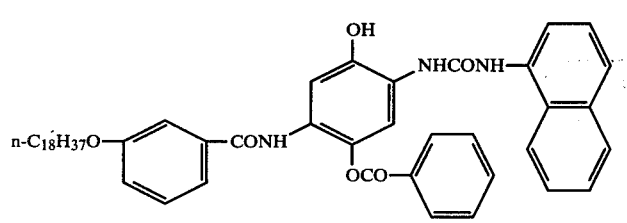
C-16

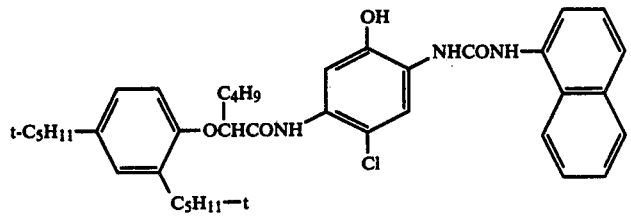
C-17
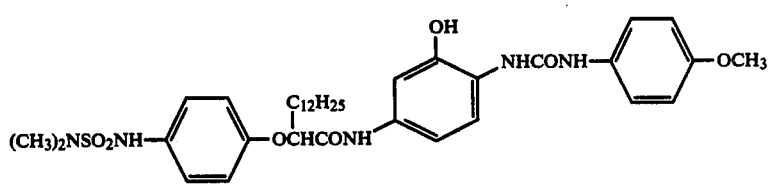
C-18
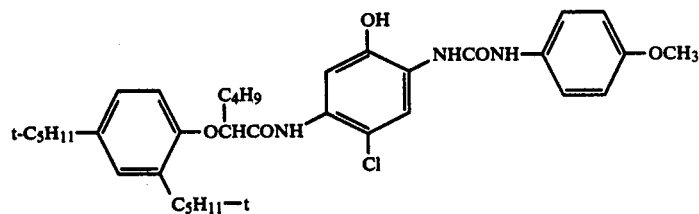
C-19
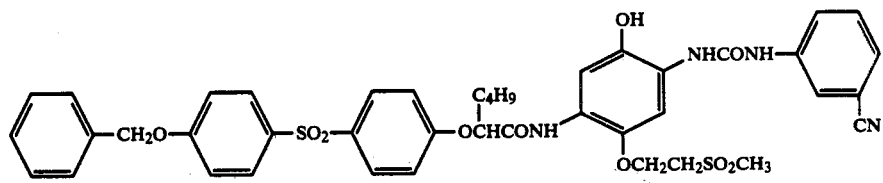
C-20
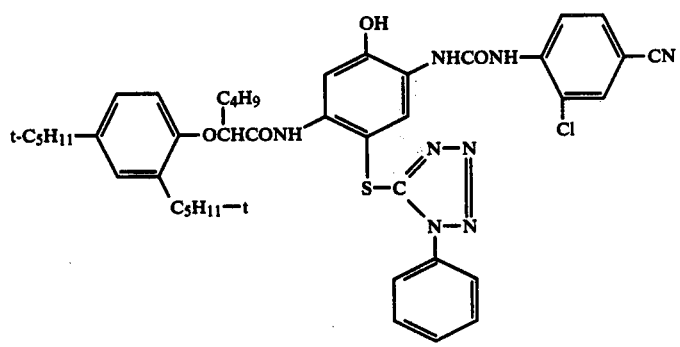
C-21
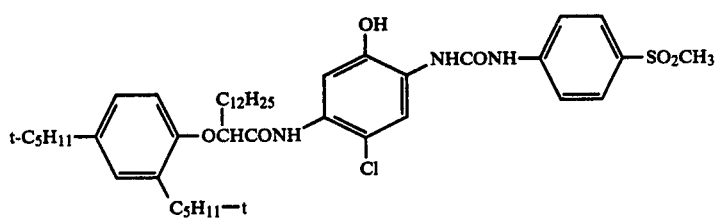
C-22
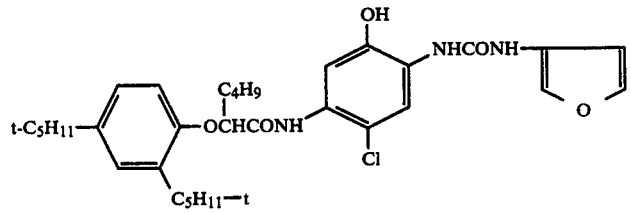
C-23

-continued
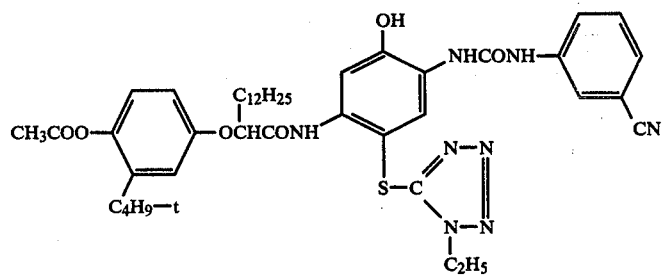
C-24
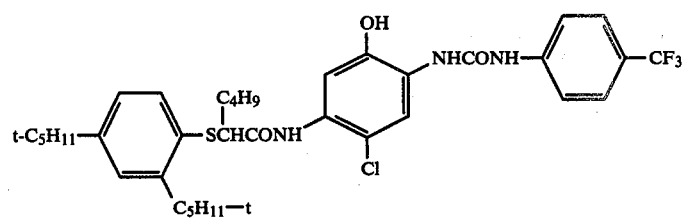
C-25
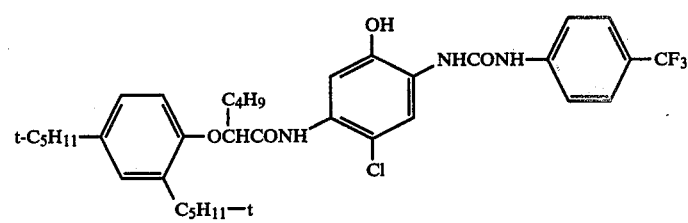
C-26
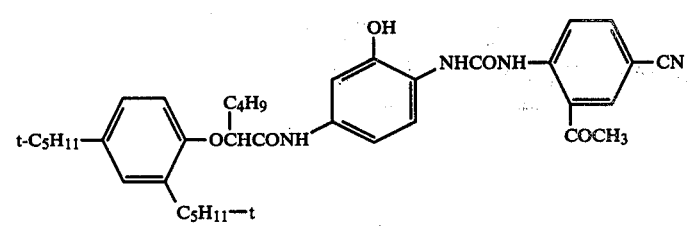
C-27
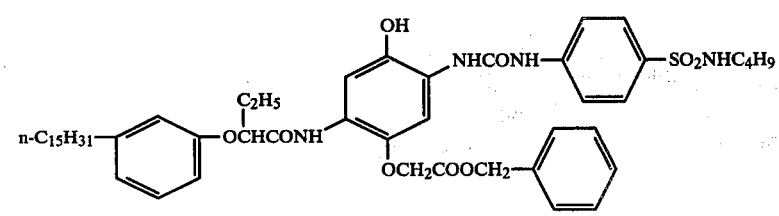
C-28
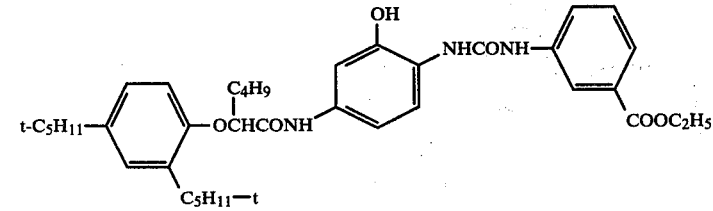
C-29
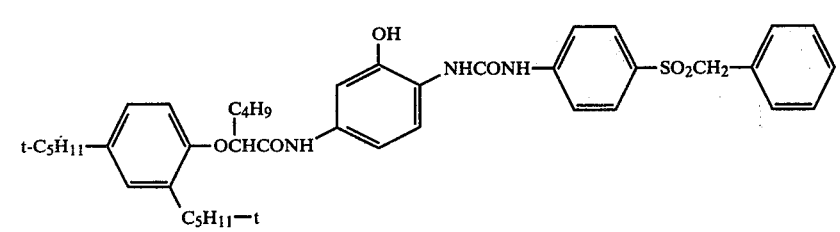
C-30

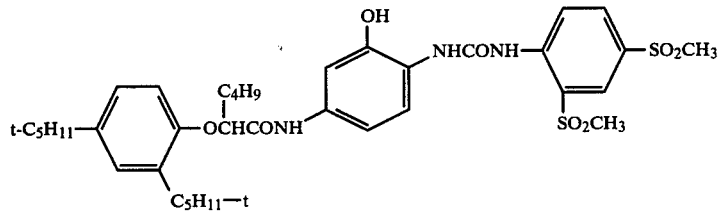
C-31
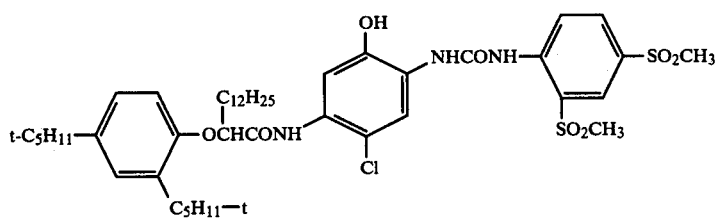
C-32
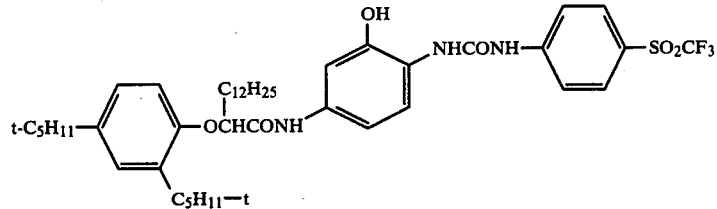
C-33
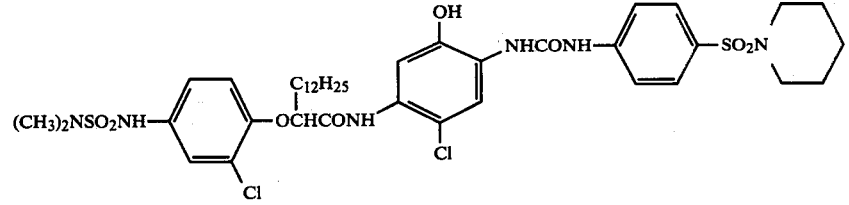
C-34
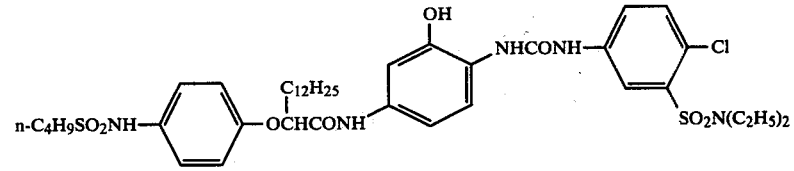
C-35
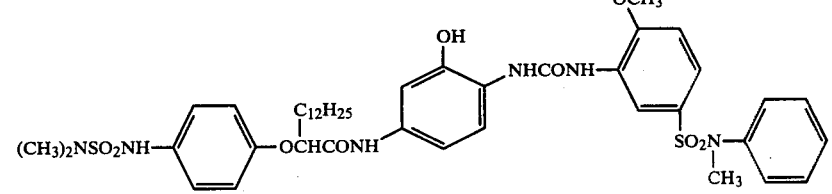
C-36
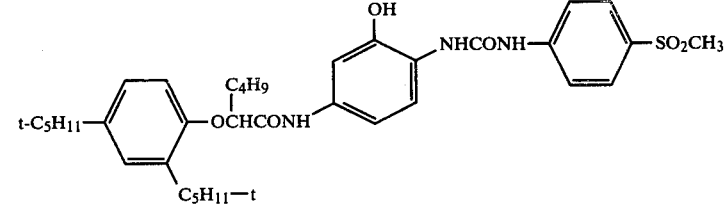
C-37

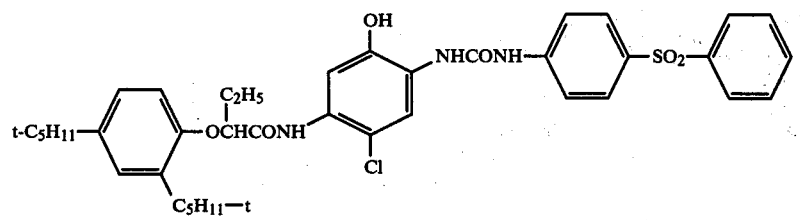
C-38
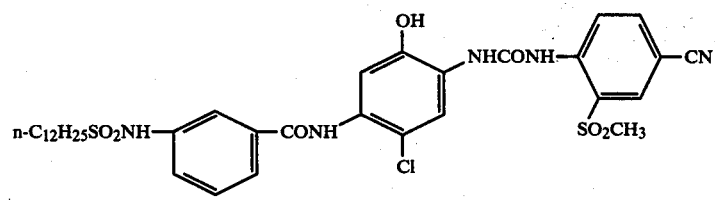
C-39
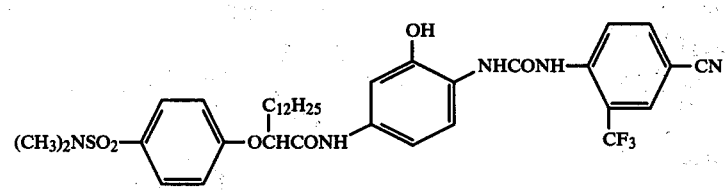
C-40
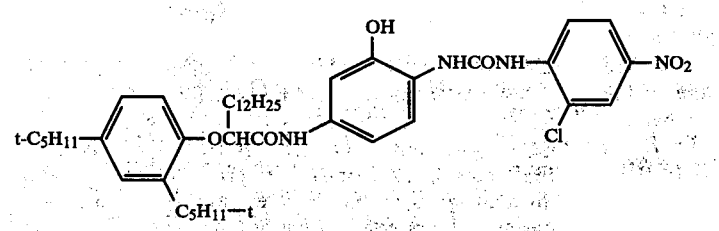
C-41
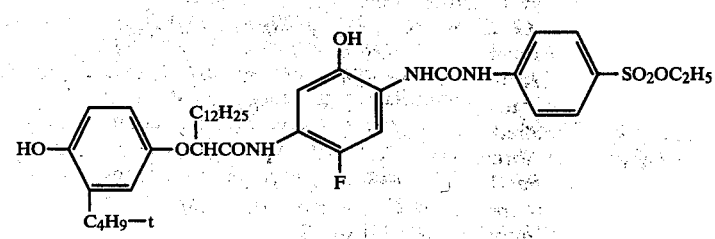
C-42
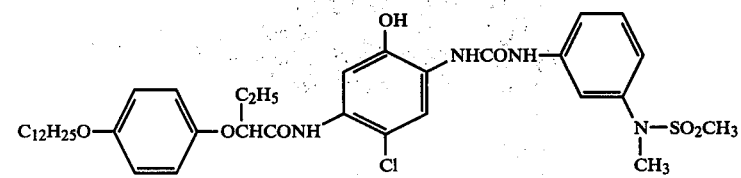
C-43
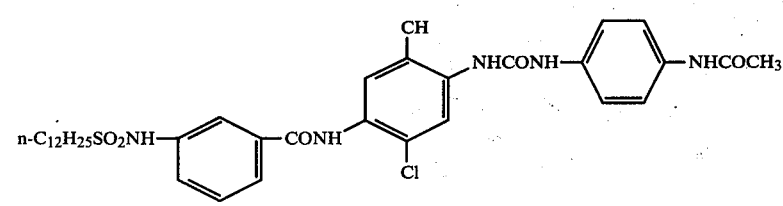
C-44

C - 45

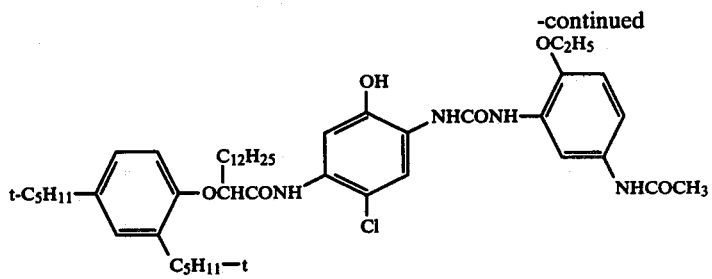

C - 46

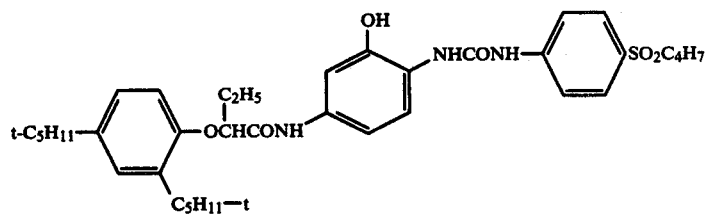

As other preferred compounds, there may also be employed those as disclosed in, for example, Japanese Laid-open Patent Applications Nos. 204543/1982, 204544/1982 and 204545/1982, and Japanese Patent Application Nos. 131312/1981, 131313/1981 and 131314/1981.

Next, the colored cyan coupler represented by the formula [II] is described below.

In the formula [II], (Coup—)$_c$ represents a cyan coupler residue such as a phenol or naphthol type cyan coupler residue. L represents a divalent linking group connecting the coupler structure moiety to the dye structure moiety and bonded to the active site of the cyan coupler residue. L may be exemplified by, for example, an oxygen atom, a sulfur atom, —OCH$_2$—, —OCH$_2$CH$_2$—, —OCH$_2$CH$_2$O—, —OCH$_2$CHOHCH$_2$O—,

—NHCOCH$_2$O—, —OCH$_2$CH$_2$OCH$_2$CH$_2$O—, —NHSO$_2$—, —OCONHCH$_2$—, —OCH$_2$CONH—, —OCH$_2$COO—, —NHCO—,

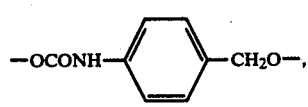

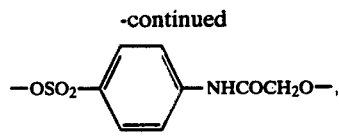

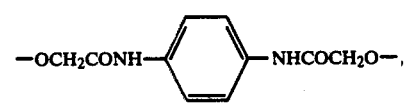

—NHSO$_2$—(CH$_2$)$_3$—O—, —NHSO$_2$—(CH$_2$)$_4$—O—, —OSO$_2$(CH$_2$)$_2$O—, —OSO$_2$(CH$_2$)$_4$—O—, —O—CONH—, —OCONHCH$_2$—, —O—CO—, —O—COCH$_2$—, and —O—CO—(CH2)$_l$—O— (where l represents 0, 1, 2, 3 or 4) (with proviso that in the above divalent groups, the coupler structure moieties are meant to be bonded to the left side thereof, while the dye structure moieties to the right side).

G represents an acyl group or an alkylsulfonyl group having 1 to 8 carbon atoms or an arylsulfonyl group having 6 to 8 carbon atoms. Q$_1$ and Q$_2$ each represent photographically inactive monovalent groups, as exemplified by hydrogen atom, halogen atoms (fluorine, chlorine, etc.), hydroxy, cyanol, alkyl groups (methyl, t-butyl, octyl, benzyl, etc.), alkoxy groups, alkylthio groups, amide groups, alkoxycarbonyl groups, alkylcarbamoyl groups and so on.

M is a cation (an alkali metal ion, ammonium ion, etc. or a hydrogen atom. J is 0 or 1.

Typical examples of the colored couplers represented by the formula [II] are enumerated below, but this invention is not limited thereto.

CC-1

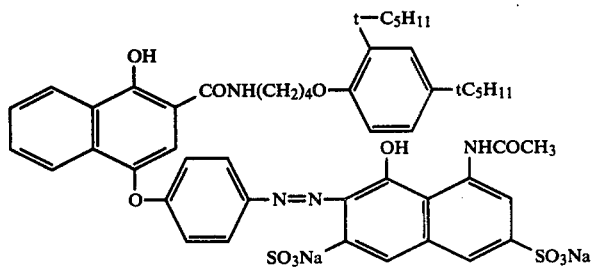

-continued
CC-2
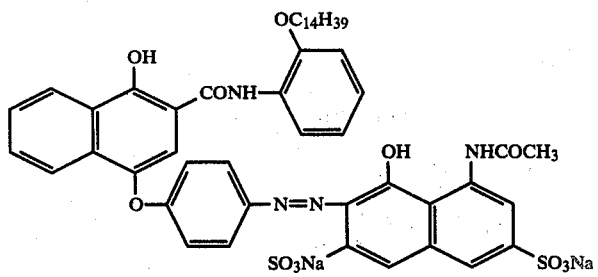
CC-3
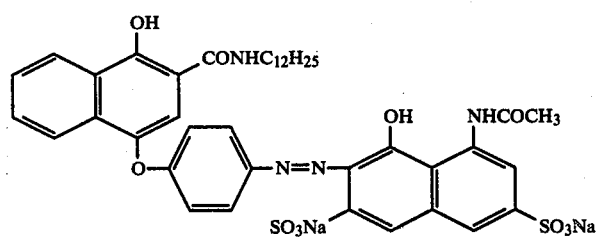
CC-4
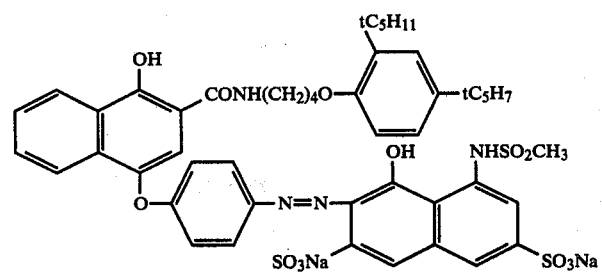
CC-5
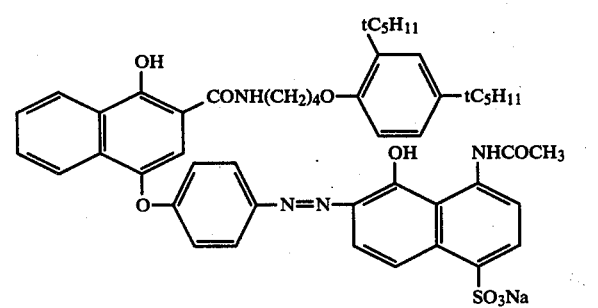
CC-6
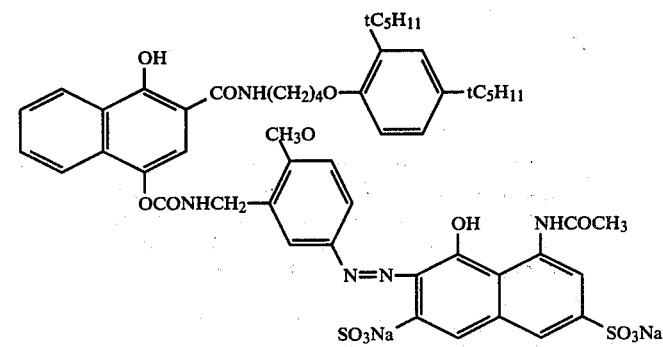

CC-7

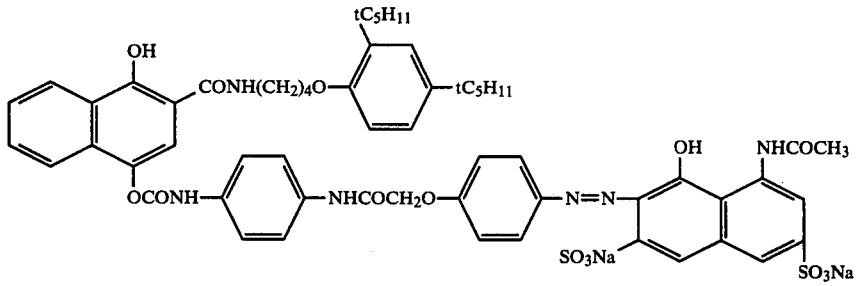

CC-8

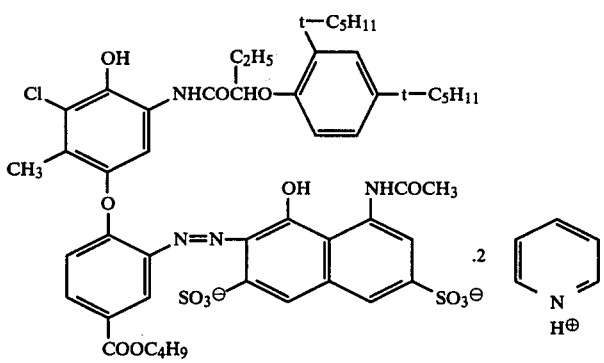

CC-9

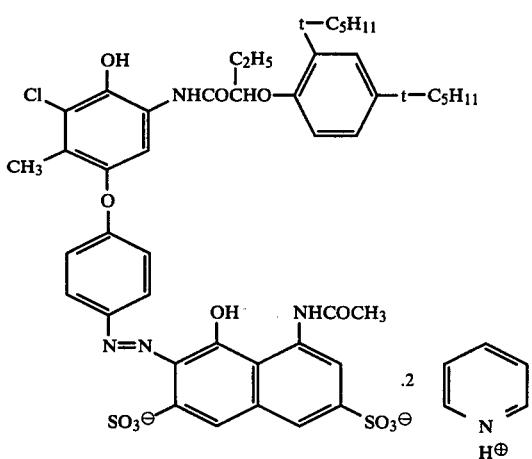

The above compounds can be synthesized according to, for example, the methods disclosed in U.S. Pat. No. 3,476,563 or Japanese Provisional Patent Publication No. 10135/1975.

The colored magenta coupler represented by the formula (III) is preferably a compound represented by the following formula (IV):

Formula (IV):

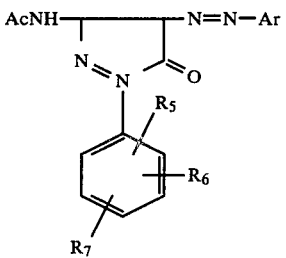

(IV)

wherein Ac represents a phenyl group, a naphthyl group or an acyl group which further may have substituents incorporated therein; $R_5$ to $R_7$ each represent the same group as $Q_1$ in the formula (II); and Ar represents a phenyl group, a naphthyl group or a heterocyclic group.

Also, as the compounds represented by the formula [III], the following examples may be mentioned, but the invention is not limited thereto.

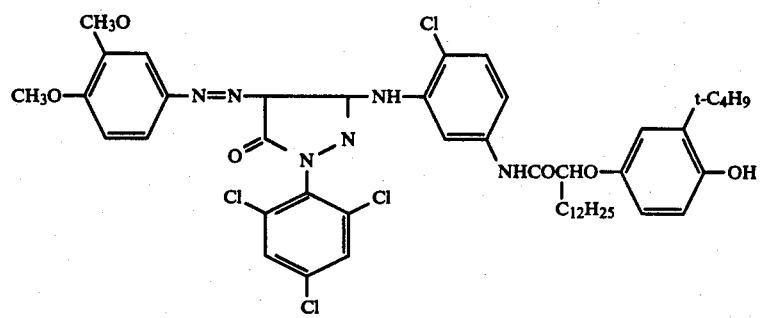
CM - 1
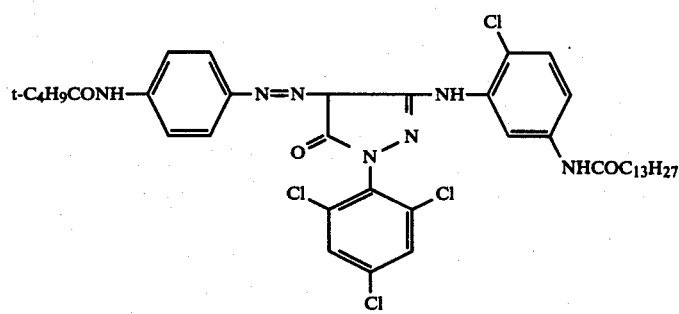
CM - 2
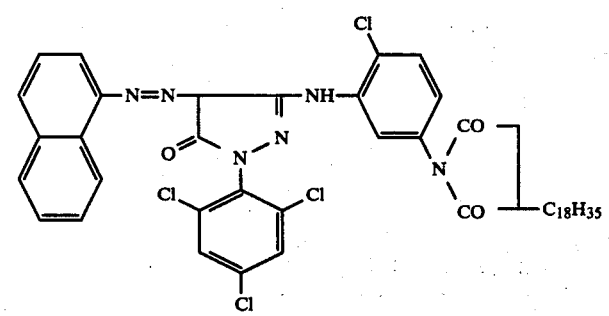
CM - 3
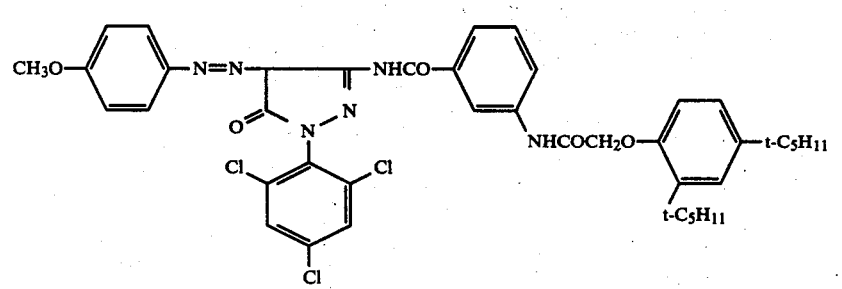
CM - 4
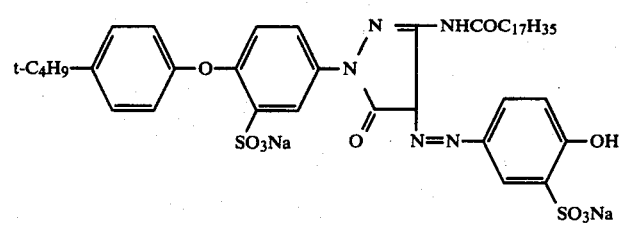
CM - 5

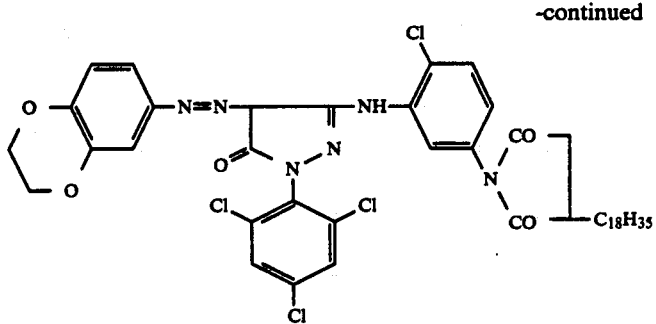

CM - 6

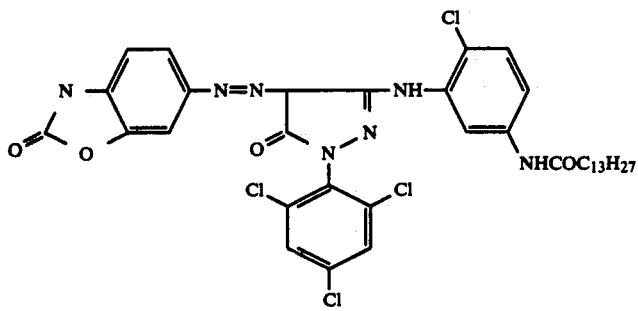

CM - 7

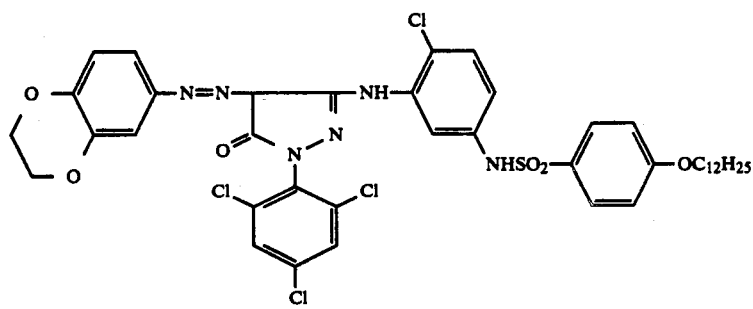

CM - 8

The above compounds can be synthesized according to the methods disclosed in U.S. Pat. Nos. 2,763,552; 2,983,608; 3,519,429; 3,615,506 and 3,476,564; U.K. Patent No. 1,044,778; Japanese Provisional Patent Publication Nos. 123,625,/1974, 131,448/1974, 52,532/1979 and 42,121/1977.

The compound of this invention represented by the formula [I], namely the colorless cyan coupler is incorporated in a silver halide emulsion layer. The amount to be incorporated may be 0.07 to 0.7 mole per mole of a silver halide, and may be incorporated in a conventional manner, by, for example, dissolving in a high boiling solvent as disclosed in U.S. Pat. No. 2,322,027.

The compound of this invention represented by the formula [II], namely the colored cyan coupler can be generally dissolved in either water or an organic solvent, and may be incorporated into a multi-layer light-sensitive material by use of a suitable solvent. For example, it may be dissolved in water in the presence of a surfactant, an auxiliary solvent such as ethyl acetate, ethyl alcohol, etc. or in the presence of an alkali, or alternatively by dissolving in a high boiling slvent as disclosed in U.S. Pat. No. 2,322,027.

The compound represented by the formula [III] of this invention, that is the colored magenta coupler may be added into a multi-layer light-sensitive material similarly as the compounds [I] and [II] by dissolving in a suitable solvent.

The colored coupler represented by the formula [II] or [III] may be incorporated directly into the silver halide emulsion layer containing the compound of the formula [I], namely the cyan image forming layer, or alternatively into a layer contiguous thereto. The total amount of the colored coupler of this invention to be coated should preferably be determined so that the optical density at the absorption peak wavelength under the coated state may be 0.05 to 1.0. The colored magenta coupler may be coated in the cyan image forming layer of this invention in an amount so that the optical density at the absorption peak wavelength may be 0.005 to 0.5.

The cyan coupler of this invention is generally used by being incorporated in a red sensitive silver halide emulsion. However, it is not necessarily required to be contained in the red sensitive silver halide emulsion, but, in combination with other couplers or spectral sensitizers, it may also be used in combination with a blue sensitive silver halide emulsion or a green sensitive silver halide emulsion.

As the silver halide to be used in the silver halide emulsion of this invention, there may be included any desired silver halide conventionally used in silver halide emulsions, such as silver bromide, silver chloride, silver iodobromide, silver chlorobromide, silver chloroiodobromide and the like.

The silver halide emulsion constituting the silver halide emulsion of this invention may be prepared according to all preparation methods, including first the conventional preparation methods, as well as various other methods, such as the method disclosed in Japanese Patent Publication No. 7772/1971, namely the preparation method of the so called conversion emulsion, comprising forming an emulsion of silver salt grains comprising at least a part of silver salts greater in solubility than silver bromide and then converting at least a part of these grains into silver bromide or silver iodide or the preparation method of the Lipman emulsion comprising minute particulate silver halide of 0.1μ or less.

Further, the silver halide emulsion of this invention may be chemically sensitized by using either alone or optimally in combination sulfur sensitizers such as allylthiocarbamide, thiourea, cystine, etc; or active or inactive selenium sensitizers; and reducing sensitizers such as stannous salts, polyamines; noble metal sensitizers such as gold sensitizers, typically potassium aurithiocyanate, potassium chloroaurate, 2-aurosulfobenzthiazolemethyl chloride, etc.; or sensitizers of water soluble salts such as of ruthenium, rhodium, iridium, etc., typically ammonium chloropalladate, potassium chloroplatinate and sodium chloropalladite, and so on.

It is also possible to incorporate in the silver halide emulsion of this invention various known additives for photography such as those disclosed in, for example, Research Disclosure, December, 1978, Item 17643.

The silver halide of this invention may be subjected to spectral sensitization for imparting light-sensitivity to the necessary light-sensitive wavelength region by selection of a suitable sensitizing dye. As such sensitizing dyes, there may be employed various kinds of dyes, which may be used either as a single kind or as a combination of two or more kinds.

As the spectral sensitizing dyes to be employed in this invention there may be included typically cyanine dyes, melocyanine dyes or complex cyanine dyes as disclosed in U.S. Pat. Nos. 2,269,234; 2,270,378; 2,442,710; 2,454,620; and 2,776,280.

The color developer to be used in this invention may preferably contain an aromatic primary amine type color developing agent as principal ingredient. Typical examples of this color developing agent are p-phenylenediamine type compounds, including, for example, diethyl-p-phenylenediamine hydrochlorides, monomethyl-p-phenylenediamine hydrochlorides, dimethyl-p-phenylenediamine hydrochlorides, 2-amino-5-(N-ethyl-N-dodecylamino)-toluene, 2-amino-5-(N-ethyl-N-β-methanesulfonamidoethyl)aminotoluene sulfate, 4-(N-ethyl-N-β-methanesulfonamidoethylamino)aniline, 4-(N-ethyl-N-β-hydroxyethylamino)aniline, 2-amino-5-(N-ethyl-N-β-methoxyethyl)aminotoluene and others.

After development, conventional steps of bleaching, fixing or bleach-fixing, washing and drying for removal silver and silver halide are conducted.

This invention is illustrated in more detail by referring to the following Examples, by which the embodiments of this invention are not limited.

EXAMPLE 1

The couplers and the colored cyan couplers including the combinations of the couplers and the colored cyan couplers according to this invention of this invention as indicated in Table 1 were sampled in amounts as indicated in Table 1, respectively, and added to a mixture of dibutyl phthalate in an amount equal to the total amount of each combination and ethyl acetate in an amount three times said total amount and dissolved therein by heating to 60° C. Each solution was mixed with 200 ml of a 5% aqueous gelatin solution containing 20 ml of a 5% aqueous solution of Alkanol B (alkylnaphthalene sulfonate, produced by Du Pont de Nemours & Company), and emulsified in a colloid mill to obtain an emulsified product to prepare each dispersion of a coupler and a colored coupler. Then, each dispersion was added to a red sensitive silver iodobromide emulsion (containing 7 mol % of silver iodide) containing 0.1 mol of silver, followed by addition of 0.1 g of the reaction product of 1,2-bisvinylsulfonylethane with taurin and the resultant mixture was coated on a transparent cellulose triacetate film base and dried to obtain 8 kinds of light-sensitive silver halide color photographic materials [Sample Nos. (1)–(8)].

TABLE 1

Control coupler (C - I):

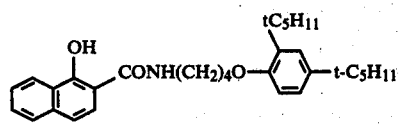

Control coupler (C - II):

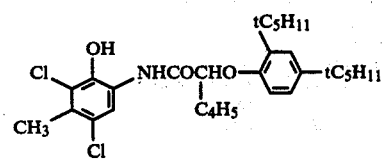

Control coupler (C - III):

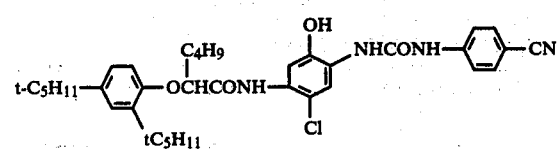

| Sample | Kind of coupler | Amount of coupler | Kind of colored cyan coupler | Amount of colored cyan coupler |
|---|---|---|---|---|
| 1 | Control (C - I) | 0.02 mol | | |
| 2 | Control (C - I) | " | Examplary compound of Invention CC-1 | 0.015 mol |
| 3 | Control (C - II) | " | | |
| 4 | Control (C - II) | " | Exemplary compound of Invention CC-1 | 0.0015 mol |
| 5 | Control (C - III) | " | | |
| 6 | Control (C - III) | " | Exemplary compound of Invention CC-1 | 0.0015 mol |
| 7 | Exemplary compound of Invention 37 | " | | |
| 8 | Exemplary compound of Invention 37 | " | Exemplary compound of Invention CC-1 | 0.0015 mol |

The thus prepared respective samples were subjected to wedge exposure according to the conventional method, followed by the following development processings to obtain the results as shown in Table 2.

| [Processing] (38° C.) | Processing time |
|---|---|
| Color development | 3 minutes 15 seconds |
| Bleaching | 6 minutes 30 seconds |
| Washing with water | 3 minutes 15 seconds |
| Fixing | 6 minutes 30 seconds |
| Washing with water | 3 minutes 15 seconds |
| Stabilization | 1 minute 15 seconds |

The following processing solutions were used in the processing steps:

[Composition of color developing solution]

| | |
|---|---|
| 4-Amino-3-methyl-N—ethyl-N—($\beta$-hydroxyethyl)-aniline sulfate | 4.75 g |
| Anhydrous sodium sulfite | 4.25 g |
| Hydroxylamine half-sulfate | 2.0 g |
| Anhydrous potassium carbonate | 37.5 g |
| Sodium bromide | 1.3 g |
| Trisodium nitrilotriacetate (monohydrate) | 2.5 g |
| Potassium hydroxide | 1.0 g |

Made up to 1 liter with water, and adjusted to pH 10.0 with potassium hydroxide.

[Composition of bleaching solution]

| | |
|---|---|
| Ferric ammonium salt of ethylenediamine-tetraacetic acid | 100.0 g |
| Diammonium salt of ethylenediamine-tetraacetic acid | 10.0 g |
| Ammonium bromide | 150.0 g |
| Glacial acetic acid | 10.0 ml |

Made up to 1 liter with water and adjusted to pH 6.0 with aqueous ammonia

[Composition of fixing solution]

| | |
|---|---|
| Ammonium thiosulfate (50% aqueous solution | 162 ml |
| Anhydrous sodium sulfite | 12.4 g |

Made up to 1 liter with water and adjusted to ph 6.5 with acetic acid

[Composition of stabilizing solution]

| | |
|---|---|
| Formalin (37% aqueous solution) | 5.0 ml |
| Konidax (available from Konishiroku Photo Industry Co., Ltd.) | 7.5 ml |

Made up to 1 liter with water.

Development processings were performed under the conditions as mentioned above.

TABLE 2

| Sample | Matter | Sensitivity | Fog | Maximum* density | Secondary** absorption density |
|---|---|---|---|---|---|
| 1 | Control | 100 | 0.14 | 2.10 | 0.24 |
| 2 | " | 103 | 0.16 | 2.21 | |
| 3 | " | 127 | 0.25 | 2.30 | 0.34 |
| 4 | " | 128 | 0.27 | 2.32 | |
| 5 | " | 120 | 0.16 | 2.25 | 0.28 |
| 6 | " | 120 | 0.17 | 2.27 | |
| 7 | " | 122 | 0.15 | 2.20 | 0.27 |
| 8 | Invention | 123 | 0.16 | 2.24 | |

*Sensitivity, fog and maximum density were each determined from the characteristic curve for the red light absorption. Sensitivity was represented in terms of relative value to that of Sample No. 1 as 100.
**Secondary absorption density was determined detracting the light absorption density of green at the fog portion from the light absorption density of green at the wedge at which the maximum density was obtained in red light absorption.

In comparison between Samples No. 1, No. 3, No. 5 and No. 7, the coupler (C-II) of No. 3 can give a sensitivity and a maximum density which are both higher than those of the cyan coupler (C-12) used in this invention, but its maximum absorption wavelength is as short as 667 nm with greater secondary absorption of the color formed dye and therefore not preferred as a cyan coupler for a nega color light-sensitive material. Further, Control samples including Sample No. 3 and No. 4 have the drawback of high fog.

In (C-I), (C-II) and (C-37) used in Samples No. 1, No. 2, No. 5 and No. 6, there is observed the characteristic that all the dyes provided have the long maximum absorption wavelength of 697 nm and the secondary absorption is also small. Among these samples, it will be appreciated that the combination of this invention of No. 8 has excellent sensitivity, fog and maximum density.

Figure 2:
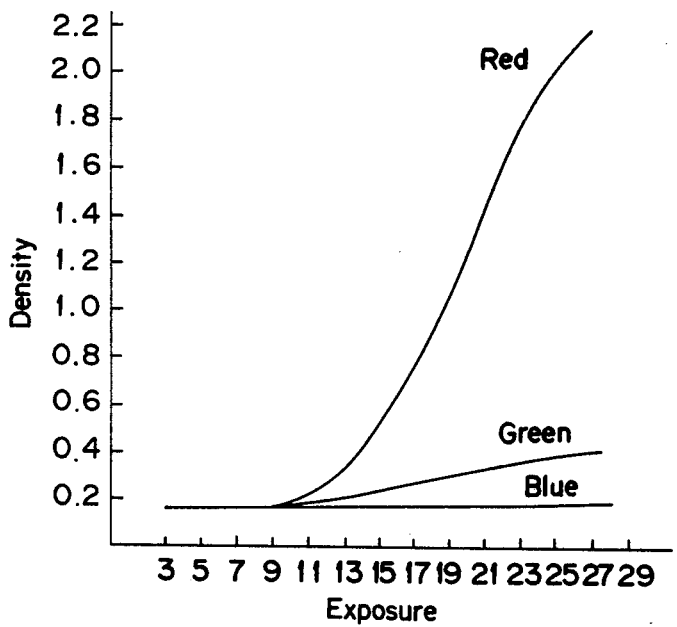
FIG. 2 is a graph indicating the characteristic curves for red, green and blue light absorptions of Sample No. 2.
Figure 3:
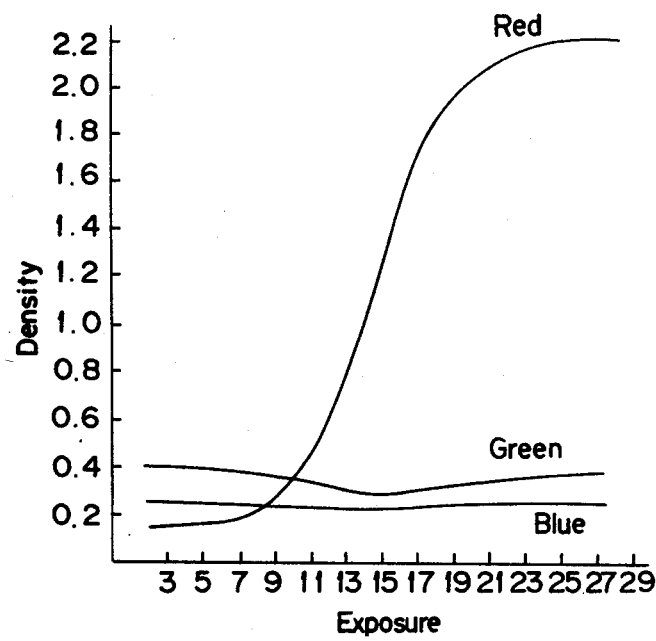
FIG. 3 is a graph indicating the characteristic curves for red, green and blue light absorptions of Sample No. 7.
Figure 4:
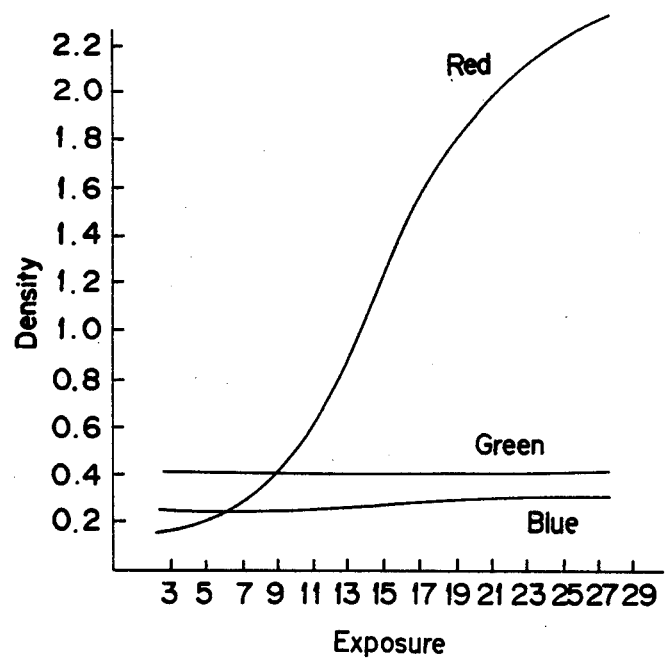
FIG. 4 is a graph indicating the characteristic curves for red, green and blue light absorptions of Sample No. 8.

Also, for illustration of excellent masking characteristic, FIG. 1 shows the characteristic curves of Sample No. 1, and similarly FIGS. 2–4 those of Sample No. 2, No. 7 and No. 8, respectively. From FIG. 1 and FIG. 3, it can be seen that in both Samples No. 1 and No. 7, the characteristics curves for green and blue lights are similarly increased through secondary absorption as the increase in density for red light absorption. In Control sample No. 2, due to the difference in reactivity between the cyan coupler and the colored cyan coupler of C-I and CC-1, no uniform characteristic over the whole region cannot be obtained as shown in FIG. 3. FIG. 4 shows the masking characteristic of Sample No. 8, which is the combination according to this invention. It can be appreciated that there is obtained a uniform masking characteristic.

EXAMPLE 2

Similarly as described in Example 1, there were prepared mixed dispersions of the cyan couplers and the colored cyan couplers corresponding to Sample No. 6 and No. 8, and they were added to red sensitive silver iodobromide emulsions similarly as in Example 1 to provide coating solutions. Then, these coating solutions were kept under warming at 42° C. for one hour, 3 hours, and 8 hours. Subsequently, these coating solutions were admixed with film hardeners similarly as in Example 1 and coated on bases and dried to obtain Samples 9 and 10.

As the next step, these samples were subjected to wedge exposure and applied with the processings similarly as described in Examples. The results are given in Table 3.

TABLE 3

| | | Change of relative sensitivity* | | |
|---|---|---|---|---|
| Sample | Matter | 1 hour | 3 hours | 8 hours |
| 9 | Control C-III + CC-1 | 120 | 118 | 100 |
| 10 | Invention C-37 + CC-1 | 123 | 122 | 122 |

*Shown in terms of the relative values to the sensitivity of Sample No. 1 in Example 1 as 100.

From Table 3, it can clearly been seen that Control sample No. 9 has the drawback in stagnant storability of the coating solution, while Sample No. 10 of this invention can be appreciated to be very excellent in stability to a great advantage in manufacturing steps.

EXAMPLE 3

Samples No. 2, No. 4 and No. 8 were processed in entirely the same manner as in Example 1 except that the composition of the bleaching solution was changed as shown elow and further the processing time was changed to 4 minutes and 20 seconds.

[Composition of bleaching solution]

-continued

| | |
|---|---|
| Ferric ammonium salt of ethylenediamine-tetraacetic acid | 100.0 g |
| Diammonium salt of ethylenediamine-tetraacetic acid | 10.0 g |
| Ammonium bromide | 150.0 g |
| Glacial acetic acid | 10.0 ml |
| Sodium hydrosulfite | 3.0 g |
| Made up to 1 liter with water and adjusted to pH 5.5 with aqueous ammonia | |

The results obtained are shown in Table 4.

TABLE 4

| Sample | Matter | Sensitivity* | Fog | Maximum density | Poor color return percentage |
|---|---|---|---|---|---|
| 2 | Control | 75 | 0.16 | 1.5 | 29% |
| 4 | Control | 78 | 0.27 | 1.7 | 26% |
| 8 | Invention | 120 | 0.16 | 2.3 | 0 |

*Sensitivity was represented in terms of relative value to that of Sample No. 1 in Example 1 as 100.

**Poor color return percentage is represented, when the maximum density of No. 2, 4, 8 is given by a and the maximum density obtained by the processing in this Example by b, by the following formula:

Poor color return percentage $= \frac{a-b}{a}$

As apparently seen from Table 4, it can be appreciated that the Sample No. 6 of this invention is very excellent in processing characteristics, weak in oxidizing power and generates no poor color return even in a bleaching processing at a low pH.

EXAMPLE 4

The couplers and the colored couplers including combinations of the couplers and the colored couplers of this invention as indicated in Table 1 were sampled in amounts of 0.02 mol and 0.0015 mol, respectively, and dissolved similarly as in Example 1 to prepare emulsified emulsions, which are then added to silver iodobromide emulsions and coated similarly as described in Example 1 to obtain four kinds of light-sensitive silver halide color photographic materials (Sample Nos. 11–14).

TABLE 5

Control CC - i:

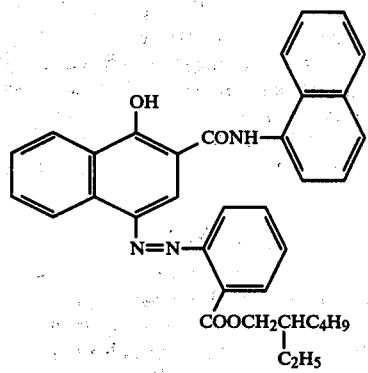

Control CC - ii:

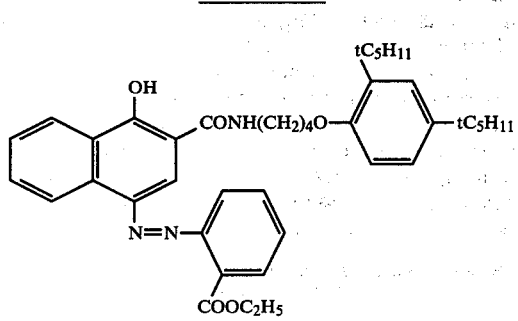

TABLE 5-continued

| Sample | Kind of coupler | Kind of colored coupler |
|---|---|---|
| 11 | Exemplary compound of Invention C-37 | Control CC-i |
| 12 | Exemplary compound of Invention C-37 | Control CC-ii |
| 13 | Exemplary compound of Invention C-22 | Exemplary compound of Invention CC-6 |
| 14 | Exemplary compound of Invention C-9 | Exemplary compound of Invention CC-6 |

The respective samples thus obtained were exposed to light and subjected to a series of processings as described in Example 1.

As the result, only the Samples No. 13 and No. 14 within the scope of this invention gave effective masking characteristics, and other samples No. 11 and 12 gave no sufficient masking characteristic.

Figure 5:
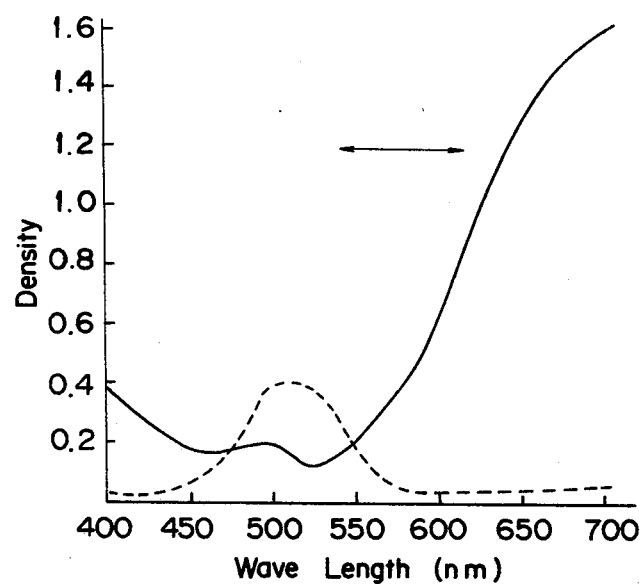
FIG. 5 is a graph indicating the characteristic curves for red, green and blue light absorptions of Sample No. 12 (the portion indicated by ←→ is the green light absorbed portion which must be masked)
Figure 6:
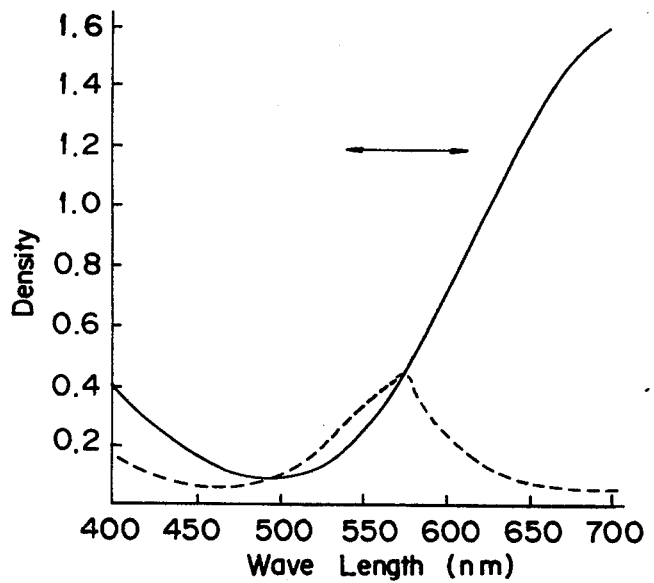
FIG. 6 is a graph indicating the characteristic curves for red, green and blue light absorptions of Sample No. 14 (the portion indicated by ←→ is the green light absorbed portion which must be masked)

For the purpose of illustration, FIG. 5 shows the spectral absorption at the fog portion of Sample No. 12 by a broken line and the spectral absorption at the color formed portion by a full line. Similarly, FIG. 6 shows the spectral absorptions for the Sample No. 14 within the scope of this invention. It can be appreciated that the Sample No. 14 within the scope of this invention is effectively masked in the wavelength region of green.

EXAMPLE 5

To the combinations of the couplers and the colored couplers corresponding to No. 6 of Example 1 and No. 13 and No. 14 of Example 4, there were added the colored magenta couplers as indicated in Table 6, respectively. The couplers were added each in amount of 0.02 mol, the colored cyan couplers in amount of 0.0016 mol and the colored magenta couplers in amount of 0.0002 mol.

TABLE 6

| Sample | Kind of coupler | Kind of colored cyan coupler | Kind of colored magenta coupler |
|---|---|---|---|
| 15 | Exemplary compound of Invention C-37 | Exemplary compound of Invention CC-1 | Exemplary compound of Invention CM-1 |
| 16 | Exemplary compound of Invention C-22 | Exemplary compound of Invention CC-6 | Exemplary compound of Invention CM-3 |
| 17 | Exemplary compound of Invention C-9 | Exemplary compound of Invention CC-6 | Exemplary compound of Invention CM-6 |

By use of the above couplers, colored cyan couplers and the colored maenta couplers, coating samples were prepared similarly as in Example 1 and further processings were carried out similarly as in Example 1.

Figure 7:
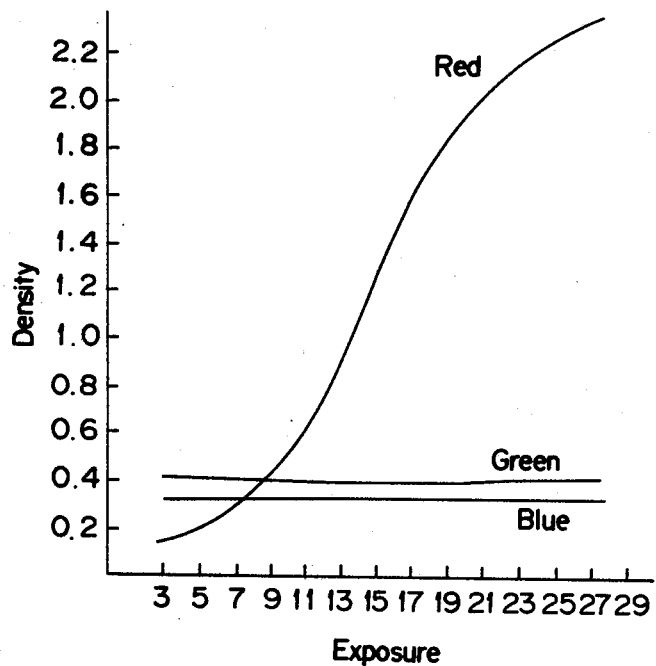
FIG. 7 is a graph indicating the characteristic curves for red, green and blue light absorptions of Sample No. 15.

As the result, each sample was found to exhibit excellent masking characteristic. Light absorption characteristics for red, green and blue lights of the Sample No. 15 are shown in FIG. 7. As compared with FIG. 4, it can be seen that further ideal masking characteristic is obtained.

EXAMPLE 6

On supports comprising a transparent polyethyleneterephthalate, there were provided respective layers shown below consecutively from the side of the support to prepare multi-layer color nega light-sensitive materials (Sample Nos. 18, 19).

First layer: Halation preventive layer

An aqueous gelatin solution containing black colloidal silver was coated at 0.3 g of silver/m² to a dried film thickness of 3.0μ.

Second layer: Intermediate layer

An aqueous gelatin solution was coated to a dried film thickness of 1.0μ.

Third layer: Low sensitivity red sensitive silver halide emulsion layer

A silver iodobromide emulsion (prepared by mixing a silver iodobromide emulsion with a mean grain size of 0.6μ containing 4 mol % of silver iodide and a silver iodobromide with a mean grain size of 0.3μ containing 4 mol % of silver iodide at a ratio of 2:1) was chemically sensitized with gold and sulfur sensitizers, and further mixed with, as red sensitive sensitizing dyes, anhydrous 9-ethyl-3,3'-di-(3-sulfopropyl)-4,5,4',5'-dibenzothiacarbocanine hydroxide; anhydrous 5,5-dichloro-9-ethyl-3,3'-di(3-sulfobutyl)thiacarbocyanine hydroxide; and anhydrous 2-[2-{(5-chloro-3-ethyl-2(3H)-benzo-thiazolildene)methyl}-1]-butenyl-5-chloro-3-(4-sulfobutyl)bnzooxazolium, followed by addition of 1.0 g of 4-hydroxy-6-methyl-1,3,3a,7-tetrazaindene and 20.0 ml of 1-phenyl-5-mecraptotetrazole to prepare a low sensitivity red sensitive emulsion.

In this emulsion, there were employed 0.15 mol of a cyan coupler, 0.01 mol of colored cyan coupler and further 0.002 mol of a colored magenta coupler in combinations as indicated in Table 7 per mol of silver halide. As a DIR compound, 1.7 g of 2-(1-phenyl-5-tetrazolylhio)-4-octadecylsuccinimide-1-indanone and 0.5 g of dodecyl gallate were added and dissolved under heating in a mixture of 65 g of tricresyl phosphate and 136 ml of ethyl acetate, and the resultant solution added into 550 ml of a 7.5% aqueous gelatin solution containing 5 g of sodium triisopropylnaphthalene sulfonate, followed by emulsification in a colloid mill. The resultant dispersion was added to the above emulsion to prepare a low sensitivity red sensitive emulsion and coated to a dried film thickness of 40μ (containing 160 g of gelatin per mole of silver halide).

Fourth layer: High sensitivity red sensitive silver halide emulsion layer

A silver iodobromide emulsion (mean grain size of 1.2μ, containing 7 mol % of silver iodide) was chemically sensitized with gold and sulfur sensitizers, and further mixed with, as red sensitive sensitizing dyes, anhydrous 9-ethyl-3,3'-di-(3-sulfopropyl)-4,5,4',5'-dibenzothiacarbocyanine hydroxide; anhydrous 5,5'-dichloro-9-ethyl-3,3'-di(3-sulfobutyl)thiacarbocyanine hydroxide; and anhydrous 2-[2-{(5-chloro-3-ethyl-2(3H)-benzothizolildene)methyl}-1]-butenyl-5-chloro-3-(4-sulfobutyl)bnzooxazolium, followed by addition of 1.0 g of 4-hydroxy-6-methyl-1,3,3a,7-tetrazaindene and 10.0 g of 1-phenyl-5-mecraptotetrazole to prepare a high sensitivity red sensitive emulsion.

In this emulsion, there were employed 0.05 mol of a cyan coupler, 0.002 mol of a colored cyan coupler, if added, and 0.0004 mol of a colored magenta coupler, if added, in combinations as indicated in Table 7 per mol of silver halide.

Further, 0.5 g of dodecyl gallate were added and dissolved under heating in a mixture of 20 g of dibutyl phthalate and 60 ml of ethyl acetate, and the resultant added into 30 ml of a 7.5% aqueous gelatin solution containing 1.5 g of sodium triisopropylnaphthalene sulfonate, followed by emulsification in a colloid mill. The resultant dispersion was added to the above emulsion to prepare a low sensitivity red sensitive emulsion and coated to a dried film thickness of 2.0μ (containing 160 g of gelatin per mol of silver halide).

Fifth layer: Intermediate layer the same as the second layer

Sixth layer: Low sensitivity green sensitive silver halide emulsion layer

A silver iodobromide emulsion with a mean grain size of 0.6μ containing 4 mol % of silver iodide and a silver iodobromide emulsion with a mean grain size of 0.3μ containing 7 mol % of silver iodide were each chemically sensitized with gold and sulfur sensitizers, and further mixed with, as green sensitive sensitizing dyes, anhydrous 5,5'-dichloro-9-ethyl-3,3'-di-(3-sulfobutyl)oxacarbocyanine hydroxide; anhydrous 5,5'-diphenyl-9-ethyl-3,3-di-(sulfobutyl)oxacarboxyanine hydroxide; and anhydrous 9-ethyl-3,3-di-(3-sulfopropyl)-5,6,5',6'-dibenzooxacarbocyanine hydroxide, followed by addition of 1.0 g of 4-hydroxy-6-methyl-1,3,3a-7-tetrazaindene and 20.0 mg of 1-phenyl-5-mercaptotetrazole. The thus obtained two kinds of silver halide emulsions were mixed at a ratio of 1:1 to prepare a low sensitivity green sensitive silver halide emulsion.

Further, per mol of silver halide, there were added as a magenta coupler 100 g of 1-(2,4,6-trichlorophenyl)-3-{3-(4-dodecyloxyphenyl)sulfonamidobenzamido}-pyrazolin-5-one, as a colored magenta coupler 2.5 g of 1-(2,4,6-tri-chlorophenyl)-4-(1-naphthylazo)-3-(2-chloro-5-octa-decenylsuccinimidoanilino)-5-pyrazolone, and further 0.5 g of dodecyl gallate was added and dissolved under heating in a mixture of 120 g of tricresyl phosphate and 240 ml, and the resultant solution added into an aqueous gelatin solution containing sodium triiso-propylnaphthalene sulfonate, followed by emulsification in a colloid mill. The resultant dispersion was mixed with the above emulsion to prepare a low sensitivity green sensitive emulsion, which was coated to a dried film thickness of 4.0μ (containing 160 g of gelatin per mole of silver halide).

Seventh layer: High sensitivity green sensitive silver halide emulsion layer A silver iodobromide emulsion with a mean rain size of 1.2μ containing 7 mol % of silver iodide was chemically sensitized with gold and sulfur sensitizers, and further mixed with, as green sensitive sensitizing dyes, anhydrous 5,5'-dichloro-9-ethyl-3,3'-di-(3-sulfobutyl)oxacarbocyanine hydroxide; anhydrous 5,5'-diphenyl-9-ethyl-3,3'-di-(sulfobutyl)oxacarboxyanine hydroxide; and anhydrous 9-ethyl-3,3'-di-(3-sulfopropyl)-5,6,5',6'-dibenzooxacarbocyanine hydroxide, followed by addition of 1.0 g of 4-hydroxy-6-methyl-1,3,3a-7-tetrazaindene and 10.0 mg of 1-phenyl-5-mercaptotetrazole to prepare a high sensitivity green sensitive silver halide emulsion.

Further, there were added as a magenta coupler 80 g of 1-(2,4,6-trichlorophenyl)-3-{3-(2,4-tert-amylphenoxyacetamido)benzamido}-pyrazolin-5-one, as a colored magenta coupler 2.5 g of 1-(2,4,6-trichlorophenyl)-4-(1-naphthylazo)-3-(2-chloro-5-octa-decenylsuccinimidoanilino)-5-pyrazolone and 1.5 g of 2,5-di-t-octylhydroquinone, respectively, and dissolved under heating in a mixture of 120 g of tricresyl phosphate and 240 ml, and the resultant solution added into an aqueous gelatin solution containing sodium triisopropylnaphthalene sulfonate, followed by emulsification in a colloid mill. The resultant dispersion was mixed with the above emulsion to prepare a high sensitivity green sensitive emulsion, which was coated to a dried film thickness of $2.0\mu$ (containing 160 g of gelatin per mole of silver halide).

Eighth layer: Intermediate layer
the same as the second layer

Ninth layer: Yellow filter layer

In an aqueous gelatin solution having yellow colloidal silver dispersed therein, there was added a dispersion containing a solution of 3 g of 2,5-di-t-octylhydroquinone and 1.5 g of di-2-ethylhexylphthalate dissolved in 10 ml of ethyl acetate dispersed in an aqueous gelatin solution containing 0.3 g of sodium triisopropylnaphthalane sulfonate, and the resultant mixture was coated at a proportion of 0.9 g of gelatin/m$^2$ and 0.10 g of 2,5-di-t-octylhydroquinone to a dried film thickness of $1.2\mu$.

Tenth layer: Low sensitivity blue sensitive silver halide emulsion layer

A silver iodobromide emulsion with a mean grain size of $0.6\mu$ containing 6 mol % of silver iodide was chemically sensitized with gold and sulfur sensitizers, and further mixed with, as sensitizing dyes, anhydrous 5,5'-dimethoxy-3,3'-di-(3-sulfopropyl)thiacyanine hydroxide, followed by addition of 1.0 g of 4-hydroxy-6-methyl-1,3,3a-7-tetrazaindene and 20.0 mg of 1-phenyl-5-mercaptotetrazole to prepare a low sensitivity blue sensitive silver halide emulsion.

Further, per mol of silver halide, there were added as a yellow coupler 120 g of α-pivaloyl-α-(1-benzyl-2-phenyl-3,5-dioxo-1,2,4-triazolidine-4-yl)-2'-chloro-5'-5'-[α-(dodecyloxycarbonyl)ethoxycarbonyl]acetanilide and 50 g of α-{3-[α-(2,4-di-t-amylphenoxy]butylamide)}-benzoyl-2'-methoxyacetanililde and dissolved under heating in a mixture of 120 g of dibutyl phthalate and 300 ml of ethyl acetate, and the resultant solution added into an aqueous gelatin solution containing sodium triisopropylnaphthalene sulfonate, followed by emulsification in a colloid mill. The resultant dispersion was mixed with the above emulsion to prepare a low sensitivity blue sensitive emulsion, which was coated to a dried film thickness of $4.0\mu$ (containing 160 g of gelatin per mole of silver halide).

Eleventh layer: High sensitivity blue sensitive silver halide emulsion layer

A silver iodobromide emulsion with a mean grain size of $1.2\mu$ containing 7 mol % of silver iodide was chemically sensitized with gold and sulfur sensitizers, and further mixed with, as sensitizing dyes, anhydrous 5,5'-dimethoxy-3,3-di-(3-sulfopropyl)thiacyanine hydroxide, followed by addition of 1.0 g of 4-hydroxy-6-methyl-1,3,3a-7-tetrazaindene and 10.0 mg of 1-phenyl-5-mercaptotetrazole to prepare a high sensitivity blue sensitive silver halide emulsion.

Further, per mol of silver halide, there was added as a yellow coupler 80 g of α-pivaloyl-α-(1-benzyl-2-phenyl-3,5-dioxo-1,2,4-triazolidine-4-yl)-2'-chloro-5'-5'-[α-(dodecyloxycarbonyl)ethoxycarbonyl]acetanilide and dissolved under heating in a mixture of 80 g of dibutyl phthalate and 240 ml ethyl acetate, and the resultant solution added into an aqueous gelatin solution containing sodium triisopropylnaphthalene sulfonate, followed by emulsification in a colloid mill. The resultant dispersion was mixed with the above emulsion to prepare a high sensitivity green sensitive emulsion, which was coated to a dried film thickness of $2.0\mu$ (containing 240 g of gelatin per mole of silver halide).

Twelfth layer: Intermediate layer

A dispersion of a mixture of 2 g of di-2-ethylhexylphthalate, 2 g of 2-[3-cyano-3-(n-dodecylaminocarbonyl)allylidene]-1-ethylpyrolildine and 2 ml of ethyl acetate dispersed in an aqueous gelatin solution containing 0.6 g of sodium triisopropylnaphthalene sulfonate was coated at a proportion of 1.0 g of gelatin/m$^2$ to a dried film thickness of $1.0\mu$.

Thirteenth layer: Protective layer

An aqueous gelatin solution containing 4 g of gelatin and 0.2 g of 1,2-bisvinylsulfonylethane was coated at a proportion of 1.3 g of gelatin/m$^2$ to a dried film thickness of $1.2\mu$.

TABLE 7

| Layer | Additive | Sample No. 18 | Sample No. 19 |
|---|---|---|---|
| 3rd Layer: | Cyan coupler | Exemplary compound C-37 | Exemplary compound C-30 |
|  | Colored cyan coupler | Exemplary compound CC-1 | Exemplary compound CC-6 |
|  | Colored magenta coupler | Exemplary compound CM-1 | Exemplary compound CM-6 |
| 4th Layer: | Cyan coupler | Exemplary compound C-37 | Exemplary compound C-8 |
|  | Colored cyan coupler | None | Exemplary compound CC-6 |
|  | Colored magenta coupler | None | Exemplary compound CM-6 |

These high-sensitive multi-layer color nega light-sensitive materials were subjected to wedge exposure and then applied with the processing steps as described in Example 1 and the processing steps as described in Example 3.

As the result, it was found that all of the light-sensitive materials were free from poor color return and had high sensitivity with excellent color reproduction and gradation chracteristic.

We claim:

1. A light-sensitive silver halide color photographic material having at least one light-sensitive silver halide emulsion layer on a support, characterized in that said light-sensitive silver halide emulsion layer contains a cyan coupler represented by formula [I] shown below, and wherein at least one layer selected from said light-sensitive silver halide emulsion layer and a layer contiguous to said light-sensitive silver halide emulsion layer contains a colored cyan coupler represented by formula [II]:

Formula [I]:

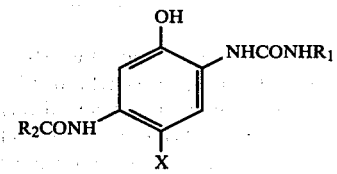

wherein x represents a hydrogen atom or a group capable of being eliminated by a coupling reaction with an oxidized product of an aromatic primary amine color developing agent; $R_1$ represents a naphthyl group or a heterocyclic group (provided that a carbon atom of said heterocyclic group is bonded to the ureido group), or a phenyl group having at least one substituent (with the proviso that when one of said substituents is cyano at the p-position of said phenyl group relative to the ureido group, the four ortho and meta positions of said phenyl group relative to the ureido group cannot have hydrogen atoms at the same time) selected from the group consisting of trifluoromethyl, nitro, cyano, —COR, —COOR, —SO$_2$R, —SO$_2$OR,

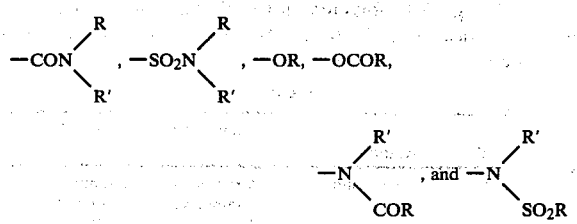

(wherein R represents an aliphatic group or an aromatic group, and R' represents a hydrogen atom, an aliphatic group or an aromatic group); and $R_2$ represents an aliphatic group or an aromatic group necessary to impart diffusion resistance to the cyan dyes formed from the cyan couplers represented by formula [I] and the cyan dyes to be formed from said cyan coupler, Formula [II]:

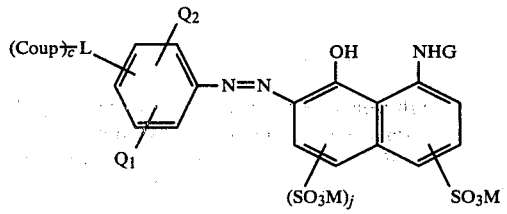

wherein (Coup—)$_c$ represents a cyan coupler residue; L represents a divalent linking group connecting the cyan coupler residue to the dye structure moiety; $Q_1$ and $Q_2$ each represent photographically inactive mono-valent groups; M represents a cation or a hydrogen atom; j is an integer of 0 or 1; and G represents an acyl group or an alkylsulfonyl group having 1 to 8 carbon atoms or an arylsulfonyl group having 6 to 8 carbon atoms.

2. The light-sensitive silver halide color photographic material according to claim 1, wherein said at least one layer further contains at least one colored magenta coupler represented by formula [III]:

(Coup—)$_M$—N=N—W      Formula [III]

wherein (Coup—)$_M$ represents a magenta coupler residue (with the proviso that the azo group is bonded to the active site of the magenta coupler); and W represents a residue of an unsaturated cyclic compound.

3. The light-sensitive silver halide color photographic material according to claim 1, wherein said cyan coupler represented by formula [I] is a compound of formula [Ia] or [Ib]:

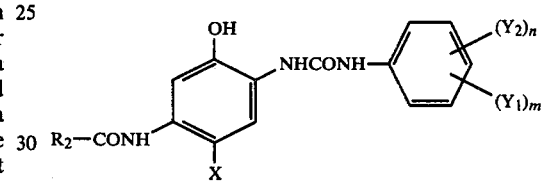

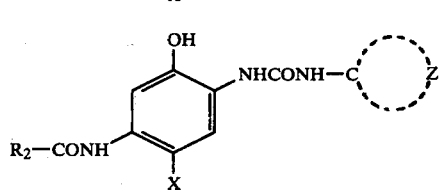

wherein, $Y_1$ is selected from the group consisting of trifluoromethyl, nitro, cyano, —COR, —COOR, —SO$_2$R, —SO$_2$OR,

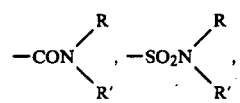

—OR, —OCOR,

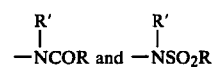

(wherein R represents an aliphatic group or an aromatic group, and R' represents a hydrogen atom or a group represented by R); $Y_2$ is selected from the group consisting of a monovalent group, an aromatic group, a halogen atom, an amino group, a hydroxy group and a substituent represented by $Y_1$; m is an integer of 1 to 3, and n is an integer of 0 to 3; and Z represents a group of non-metallic atoms necessary for forming a heterocyclic group, a substituted heterocyclic group or a naphthyl group, said heterocyclic groups being a five-membered or six-membered heterocyclic group containing 1 to 4 hetero atoms selected from nitrogen atoms, oxygen atoms and sulfur atoms.

4. The light-sensitive silver halide color photographic material according to claim 3, wherein the aliphatic group represented by R is an alkyl group having 1 to 10 carbon atoms and the aromatic group represented by R is a phenyl group; and the monovalent group represented by $Y_2$ is an aliphatic group, and the aromatic group represented by $Y_2$ is a phenyl group or a naphthyl group.

5. The light-sensitive silver halide color photographic material according to claim 4, wherein the aliphatic group represented by $Y_2$ is an alkyl group having 1 to 10 carbon atoms.

6. The light-sensitive silver halide color photographic material according to claim 3, wherein said heterocyclic group represented by Z is selected from the group consisting of a furyl group, a thienyl group, a pyridyl group, a quinonyl group, an oxazolyl group, a tetrazolyl group, a benzothiazolyl group and a tetrahydrofuranyl group.

7. The light-sensitive silver halide color photographic material according to claim 6, wherein said substituted heterocyclic group represented by Z has at least one substituent selected from the group consisting of alkyl groups having 1 to 10 carbon atoms, aryl groups, halogen atoms, cyano, nitro, sulfonamide groups, sulfamoyl groups, sulfonyl groups, fluorosulfonyl groups, carbamoyl groups, oxycarbonyl groups, acyl groups, heterocyclic groups, alkoxy groups, aryloxy groups and acyloxy groups.

8. The light-sensitive silver halide color photographic material according to claim 1, wherein $R_2$ is selected from the group consisting of an alkyl group having 4 to 30 carbon atoms, an alkenyl group, a cycloalkyl group, a five-membered or six-membered heterocyclic group and a group represented by formula [Ic]:

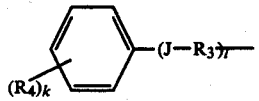

Formula [Ic]

wherein J represents an oxygen atom or a sulfur atom, K represents an integer of 0 to 4; l represents an integer of 0 or 1; $R_3$ represents a straight or branched alkyl having 1 to 20 carbon atoms; and $R_4$ represents a monovalent atom or group, wherein when K is at least 2, the atoms or groups represented by $R_4$ may be the same or different.

9. The light-sensitive silver halide color photographic material according to claim 1, wherein said cyan coupler residue represented by (Coup—)$_c$ is a phenol or naphthol type cyan coupler residue.

10. The light-sensitive silver halide color photographic material according to claim 1, wherein $Q_1$ and $Q_2$ are each selected from the group consisting of hydrogen atoms, halogen atoms, hydroxy, cyanol, alkyl groups, alkoxy groups, alkylthio groups, amide groups, alkoxycarbonyl groups and alkylcarbamoyl groups.

11. The light-sensitive silver halide color photographic material according to claim 2, wherein said colored magenta coupler represented by formula (III) is compound represented by formula (IV):

Formula (IV):

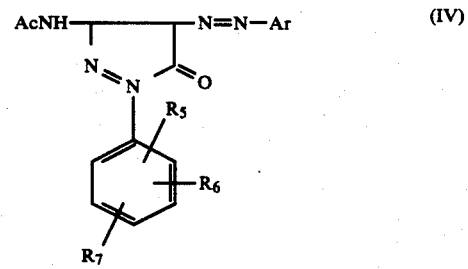

wherein Ac represents a phenyl group, a substituted phenyl group, a naphthyl group, a substituted naphthyl group, an acyl group and a substituted acyl group; $R_5$ to $R_7$ each represent the same group as $Q_1$ in the formula (II); and Ar represents a phenyl group, a naphthyl group or a heterocyclic group.

12. The light-sensitive silver halide color photographic material according to claim 1, wherein said cyan coupler represented by formula [I] is incorporated in a silver halide emulsion layer in an amount of from 0.07 to 0.7 mole per mole of silver halide.

13. The light-sensitive silver halide color photographic material according to claim 3, wherein m+n is 1 to 5.

14. The light-sensitive silver halide color photographic material according to claim 13, wherein when either $Y_1$ or $Y_2$ includes a cyano group bonded at the p-position relative to the ureido group, then m+n is 2 to 5.

15. The light-sensitive silver halide color photographic material according to claim 1, wherein the divalent linking group of L is selected from the group consisting of an oxygen atom, a sulfur atom, —OCH$_2$—, —OCH$_2$CH$_2$—, —OCH$_2$CH$_2$O—, —OCH$_2$CHOHC-H$_2$O—,

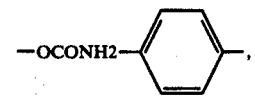

—NHCOCH$_2$O—, —OCH$_2$CH$_2$OCH$_2$CH$_2$O—, —NHSO$_2$—, —OCONHCH$_2$—, —OCH$_2$CONH—, —OCH$_2$COO—, —NHCO—,

—OCONH—⌬—CH$_2$O—,

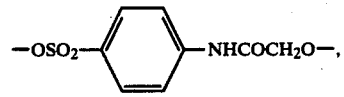

—OCH$_2$CONH—⌬—NHCOCH$_2$O—,

—NHSO$_2$—(CH$_2$)$_3$—O—, —NHSO$_2$—(CH$_2$)$_4$—O—, —OSO$_2$(CH$_2$)$_2$O—, —OSO$_2$(CH$_2$)$_4$—O—, —O—CONH—, —OCONHCH$_2$—, —O—CO—, —O—COCH$_2$—, and —O—CO—(CH2)$_l$—O— (where l represents 0, 1, 2, 3 or 4).

16. The light-sensitive silver halide color photographic material according to claim 1, wherein the total amount of the colored coupler represented by Formula [II] in said silver halide emulsion is sufficient to provide an optical density of said emulsion 0.05 to 1.0 at the absorption peak wavelength.

17. The light-sensitive silver halide color photographic material according to claim 1, wherein L is bonded to the active site of the cyan coupler residue.

* * * * *